US009741236B2

(12) United States Patent
Hess et al.

(10) Patent No.: US 9,741,236 B2
(45) Date of Patent: Aug. 22, 2017

(54) CONSUMER ALARM WITH QUIET BUTTON

(75) Inventors: Brian K. Hess, Westerville, OH (US); Frank B. Clark, Longview, TX (US)

(73) Assignee: Hippi, LLC, Clermont, FL (US)

( * ) Notice: Subject to any disclaimer, the term of this patent is extended or adjusted under 35 U.S.C. 154(b) by 0 days.

(21) Appl. No.: 13/471,133

(22) Filed: May 14, 2012

(65) Prior Publication Data

US 2012/0286951 A1 Nov. 15, 2012

Related U.S. Application Data

(60) Provisional application No. 61/486,007, filed on May 13, 2011, provisional application No. 61/616,273, filed on Mar. 27, 2012.

(51) Int. Cl.

| | |
|---|---|
| ***G08B 25/14*** | (2006.01) |
| ***B60R 25/102*** | (2013.01) |
| ***G08B 21/02*** | (2006.01) |
| ***G08B 13/00*** | (2006.01) |
| ***G08B 25/00*** | (2006.01) |
| *G08B 13/14* | (2006.01) |

(52) U.S. Cl.

CPC .......... *G08B 25/14* (2013.01); *G08B 25/008* (2013.01); *G08B 13/1436* (2013.01)

(58) Field of Classification Search

CPC .................................................... G08B 25/00

USPC ........................... 340/501, 572.1; 455/414.1

See application file for complete search history.

(56) References Cited

U.S. PATENT DOCUMENTS

| | | | | |
|---|---|---|---|---|
| 5,986,548 | A * | 11/1999 | McGregor | 340/539.26 |
| 6,975,941 | B1 * | 12/2005 | Lau et al. | 701/491 |
| 2005/0017899 | A1 * | 1/2005 | Cervinka et al. | 342/357.07 |
| 2006/0095210 | A1 * | 5/2006 | Chan | 702/3 |
| 2006/0176167 | A1 * | 8/2006 | Dohrmann | 340/506 |
| 2007/0176766 | A1 * | 8/2007 | Cheng | 340/527 |
| 2008/0129484 | A1 * | 6/2008 | Dahl et al. | 340/501 |
| 2008/0284573 | A1 * | 11/2008 | Stambaugh et al. | 340/286.02 |
| 2008/0297346 | A1 * | 12/2008 | Brackmann et al. | 340/572.1 |
| 2009/0066652 | A1 | 3/2009 | Verstraelen | |
| 2010/0102973 | A1 * | 4/2010 | Grohman et al. | 340/584 |
| 2010/0188219 | A1 * | 7/2010 | Todd | 340/568.1 |
| 2010/0279664 | A1 * | 11/2010 | Chalk | 455/414.1 |
| 2012/0194336 | A1 * | 8/2012 | Thiruvengada | G08B 13/19645 340/525 |

* cited by examiner

*Primary Examiner* — Joseph Feild
*Assistant Examiner* — Pameshanand Mahase
(74) *Attorney, Agent, or Firm* — Harness, Dickey & Pierce PLC

(57) ABSTRACT

An alarm system is disclosed. The alarm system includes an enclosure; at least one sensor, the sensor is configured to communicate a signal to the enclosure; and at least one of a wireless transceiver positioned in the enclosure, the transceiver configured to receive an activation signal and transmit an alarm signal.

6 Claims, 41 Drawing Sheets

CONSUMER ALARM WITH QUIET BUTTON

CROSS-REFERENCE TO RELATED APPLICATIONS

This application claims priority to U.S. Provisional Patent Application 61/486,007, filed on May 13, 2011 and U.S. Provisional Patent Application 61/616,273, filed on Mar. 27, 2012, the contents of which are hereby incorporated by reference in their entirety.

BACKGROUND

Alarm devices have been utilized in various areas for the protection and safety of public and private property from various threats. A threat may include anything that may cause damage or harm to person or property, including, but not limited to intruders, burglars, and disasters like fires and floods. Alarm systems may include a variety of sensor inputs including motion, sight and sound. Typically, these devices include an audible and visual alert and are directly connected, through hard lines, to a central monitoring station. The central monitoring station may contact the property owner and a public safety station, such as, but not limited to police, ambulance and fire departments. In some instances these units include an additional cellular transceiver for wireless communication to the monitoring station.

Current alarm systems are generally bulky systems that have a base station that is affixed in some manner to the specific dwelling they are intended to protect and are not portable. They generally function by activating a plurality of sensors that communicate with the base station. The base station is either activated, where all of the sensors are monitored or deactivated, where all of the sensors are not monitored.

A portable consumer alarm system, on the other hand, may be used to protect various types of property, has a simple activation process that allows the base station to recognize and connect to various sensors when used at different locations that the property owner is interested in protecting. Additionally, a portable consumer alarm system may be able to activate and deactivate various sensors that are preprogrammed to activate and deactivate with a single button while other sensors are not monitored.

SUMMARY

A new and unique consumer alarm device is disclosed. The consumer alarm device may contain a transceiver for detecting at least one alarm signal and at least one control signal from at least one remote device. The alarm device may include a variety of features including a single genie touch wake-up activation element; on demand global positioning capabilities; a power tamper backup configuration; a hot button group; auto connect configuration; sensor central monitoring station auto connect; an alarm clock; external sign communication; anti jamming capabilities; a wireless backup; an integrated camera, an integrated motion sensor, a photographic display and at least one integrated computer readable media card slot. The consumer alarm device may include each of these elements singularly or in combination in a single consumer alarm device.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1:
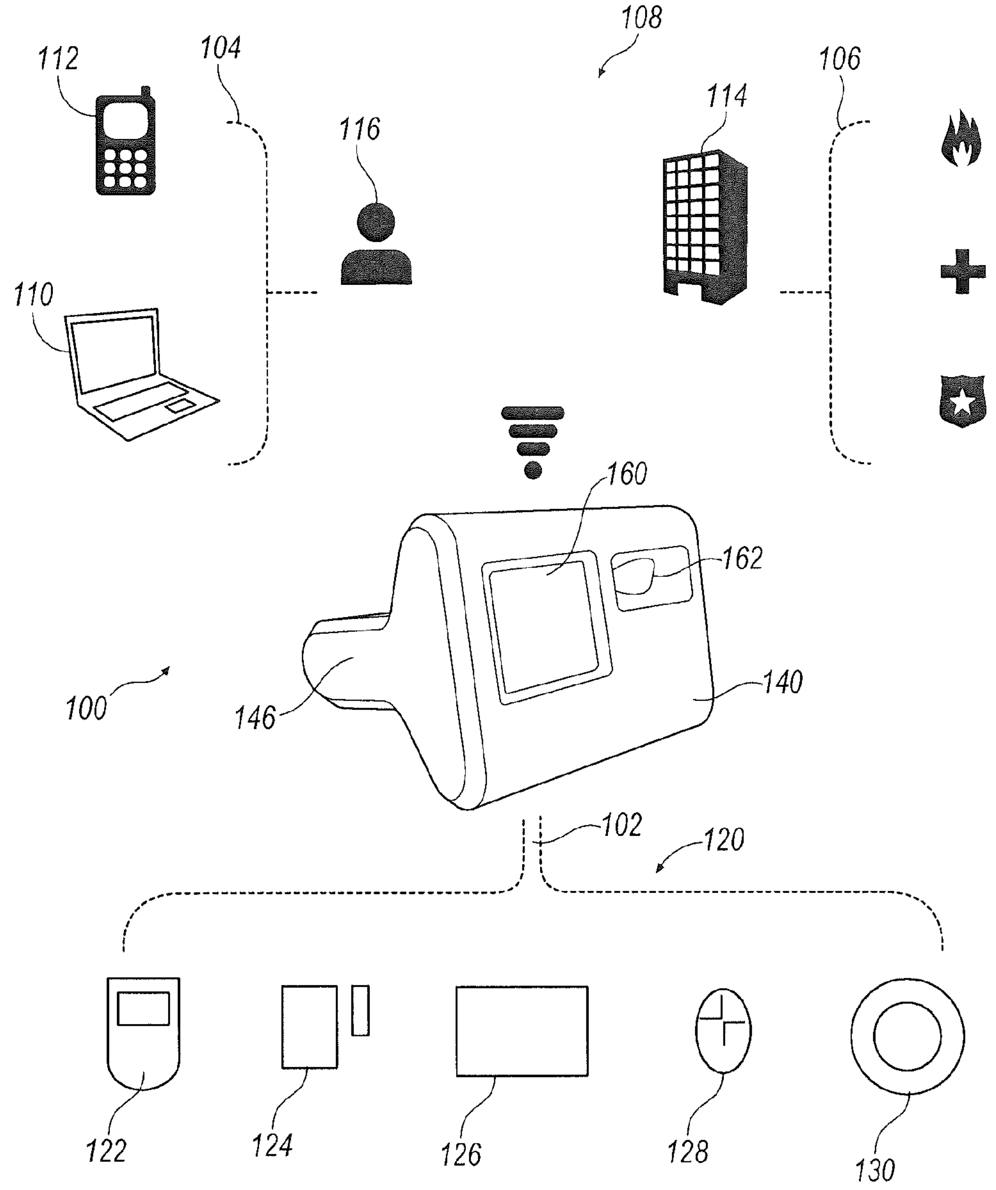
FIG. 1 illustrates an exemplary security system that includes a portable alarm device.

A portable consumer alarm device and system are disclosed. The device and system may be configured to protect various types of property, the device and system may have a simple activation process that allows a base station to recognize and connect to various sensors when used at different geographical locations that the property owner or user is interested in protecting. The portable consumer alarm system may be configured to activate and deactivate various sensors that are preprogrammed to activate and deactivate with a single activation button, while at the same time other sensors are deactivated and not monitored.

The device may be housed in a unique and strong enclosure in communication with a monitoring element, at least one alarm sensor and a communications interface. The at least one alarm sensor may include, but is not limited to, a wireless door sensor, a motion detector, a moisture detector, a smoke detector, a camera, an accelerometer or rattler device or other such alarm system monitoring sensor. The system may be configured as a stand-alone base unit that relies on at least one integrated alarm sensor or as integrated into a larger configuration of remote sensors positioned in areas at a predetermined distance from a base unit. The system may include wired or wireless communication capabilities to each sensor and to the monitoring station or a handset. The units may include cellular and other wireless capabilities to send textual and or auditory alarm notifications to a remote monitoring unit, which may be configured to send a control signal to the base unit to activate at least one function within the base unit.

The base unit may include at least one integrated sensor that is in communication with at least one alarm device processor. The processor may be a microprocessor or other computing device configured to interact directly with at least one user through an integrated control panel. The base unit and processor may also be configured to interconnect to at least one of the at least one alarm sensor and at least one existing wireless sensor or other such device, such as, but not limited to, a smoke detector, a carbon monoxide, a pet immune motion detector, motion detector or a rattler loop, which may be configured with an accelerometer or other movement detection device. The sensors may be removably fixed to a structure or element of interest to be monitored by various affixing techniques such as but not limited to adhesive bonding, fastening, strapping and magnetically.

Computing devices or processors may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices and processors generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, an assembly language, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, an EEPROM, a Flash memory device, any other memory chip or cartridge, a carrier wave as described hereinafter, or any other medium from which a computer can read.

The base unit may be configured with a specific pet feature that turns off the motion sensor but leaves all other sensors active. However, if the motion sensor is the only sensor present on the system then the pet feature will not function as a non-motion sensor needs to be available for the system to achieve the pet feature. The pet feature may include various modes for sensitivity based on the animal size. Additionally, the base unit may include a quiet button for deactivation of the keypad/screen, which allows the user to activate the alarm or deactivate the alarm without any noise.

The base unit may include a computer readable media slot, such as, but not limited to, a secure digital (SD) or other type card reading medium. The medium allows the base unit to receive firmware updates, as well as, digital imagery that allows the user to display images, such as personal photos, on the base units control screen. The base unit may also be configured to receive the firmware, the images or other computer readable media via a wireless connection configured within the housing, which allows the unit to be updated or store images for display on the control screen. The control screen may be configured to rotate depending on the orientation of the base unit. Thus, the screen may flip to a portrait view or a landscape view, as desired by the user.

The base unit may be activated or deactivated using a remote handheld device, such as, but not limited to a key fob, a portable phone and a portable media tablet. The remote handheld device or other handheld element may include at least one programmable button, such as, but not limited to a push to lock button, an access control element that allows the user to activate or deactivate through mere proximity to the base unit. The portable phone and portable media tablet may be configured with a program or application that mimics the base unit activation screen. Both the fob and the base unit may include a push-to-talk feature that allows communication between the base unit, fob, a handheld communication device or the monitoring station, thus a two-way microphone and speaker may be present in the fob and the base unit.

The base unit may also include a video camera that may appear on the screen for video communications. The video camera may be configured anywhere on the housing and may be camouflaged to prevent an intruder from realizing that an image is being created.

The base unit may include a drainage channel to direct fluids poured over the top from breaching the internal components. The base unit may also include watertight controls as well as other water deflection channels or troughs. The water tight features aid in preventing any tampering with the base unit thus a moisture detector may be included to sense when fluids are being introduced to the unit and a silent or other alarm may be sent to the user to notify the user of potential tampering. The unit may also include a built in motion sensor that may be deactivated if a secondary sensor is connected.

The base unit may include a social media feature that allows other base unit users to communicate with your base unit to notify friend type users when your system is active along with other communications features as determined by the user and friend user.

A genie touch configuration may allow a user the ability to keep the unit powered yet not operating while on standby battery. Once a user touches a configuration screen, a message will appear asking the user if he wishes to put the unit into an operating mode. If the user selects yes, the unit will power up and operate normally. If the user does not press yes, the unit will power down again within a predetermined time. The unit will automatically send a text or email to a user when the unit is one of in need of power, connected or disconnected from a power source or placed into a genie touch configuration. This allows the user to know if the unit is operating on battery power or connected directly to a power source. The battery may last for up to approximately 48 hours before requiring a charge. Additionally, when in the genie touch mode the unit may include the ability to automatically activate an on board global position satellite (GPS) feature that allows a user to track the unit if it is removed or when the unit is receiving a jamming signal. The genie touch features results in the unit appearing to be off or in a stealth mode, regardless if the unit is plugged in or not, while maintaining communication with the alarm sensors and the user by sending a silent signal or other stealth type communication, as discussed herein.

The genie touch feature allows the user to charge up their security system and take it to a remote location without draining power. After the unit is charged the operator can put it into the genie mode and remove the device from power completely. When the operator is ready to activate the unit for battery only operation, they can simply touch the screen as described above. Since the unit would be in an ultra-low-power mode (display off, radio off, GSM off, speakers off), the unit may remain in the genie mode for several days whereas it would only last approximately 20 hours on the battery if it remained in an active mode. By managing the genie mode and the operating mode correctly, a user may cover a remote location for an extending period of time, such as, but not limited to several nights.

The global position satellite (GPS) and/or cellular radio package may be used that may be activated by the user. It may be used to notify a monitoring service of an emergency and transmit the GPS to coordinate and aid in the location of the device. The GPS may include various configurations, such as, but not limited to a GPS embedded in the base unit itself, the other being GPS embedded into the sensors. If GPS is embedded into the base unit and it is stolen, a message could be sent to the user when it is powered in order to determine its location. Additionally, the sensors may also include a similar feature that allows the base unit or user to receive a message that the sensors are moved, which would activate an internal GPS to allow the base unit and/or user to track the individual sensor, thereby preventing theft of the units components.

The radio package may be in the form of an intelligent communications interface that may be programmed to translate any desired alarm signal to any suitable type of wireless digital data for further transmission as discussed further herein. For example, the wireless digital data may comprise textual digital data such as short message service (SMS) type data. SMS was created when it was incorporated into the Global System for Mobiles (GSM) digital mobile phone standard. That technology, which is now widely available and used, provides the ability to send and receive text messages to and from, for example, mobile telephones. The text can comprise words or numbers or an alphanumeric combination. When the wireless digital data comprises SMS type data, the intelligent communications interface may convert the alarm signal to a text based command set, such as an AT command set, for SMS type transmission. In another example, the alarm signal may be converted to multimedia messaging service (MMS) type data or general packet radio services (GPRS) type data. One of ordinary skill in the art understands that any type of wireless digital data can be used and that the radio component (not illustrated) is selected to utilize one or all of these data packet transport methods. In other words, the type, configuration and selection of the radio component (not illustrated) depend in part on the data packet method used to transport the wireless digital data across third party networks (e.g. Sprint, Verizon, Nextel, AT&T, etc.). These third party networks employ various types of wireless network solutions, including, but not limited to, Universal Mobile Telecommunications Systems (UTMS), Code Division Multiple Access (CDMA) Wideband Division Multiple Access (W-CDMA), General Packet Radio Services (GPRS) and High-Speed Downlink Packet Access (HSDPA) to name a few. The alarm system, and more specifically, the intelligent communications interface and the radio component, are configured to be compatible with any data packet transport method or any wireless network solution.

The intelligent communications interface radio component may also be configured internally to the outer surfaces, as discussed above. The radio component may be any suitable type of radio. The radio is selected to be capable of transmitting and receiving the desired type of wireless digital data. For example, the radio may be a cell phone that may transmit and receive SMS type data. The radio may transmit the wireless digital signal to any suitable type of service station as discussed further herein.

The base unit and/or the sensors radio package may include an anti jam feature having a unique sound or signal that is configured to turn on GPS—groupe special mobile (GSM), or code division multiple access (CDMA), and the unit may be able to switch to WI-FI to help overcome the jamming effect while sending out a silent alarm signal that the unit is being subjected to sensor jamming. Another anti-theft feature may include an individual buzzer or alarm that is triggered when the unit is moved and is included to provide base unit security when the base unit is not armed. In an anti-theft activated mode, the base unit senses any movement and an audible tone will be transmitted until movement stops. The anti-theft button/icon will change colors when the button is activated and the base unit must be at a home screen on the control panel or in screen saver mode to actuate the feature. A camera may be included to take a picture of whomever or whatever is moving the unit to send a picture to the user for forwarding on to law enforcement officials. The unit may be connected to a residence marker, such as, but not limited to a yard sign that illuminates to inform law enforcement officials of the security violation. The residence marker may include an illumination device, an alarm beacon and a GPS locator for quick notification.

One exemplary application for a GPS may be when it is used in conjunction with remote sensors and the base unit simultaneously. In an application like that, the base unit may activate the GPS portion of the security sensor when an alarm occurs from that sensor or the sensor has not been able to check in with the base unit for a predetermined amount of time. When that occurs, the cellular transmitter within the sensor would send the message out to monitoring center or user indicating that the unit is no longer within the confines of the security system. At that time the message could be sent to the user asking if they wish tracking services. This would allow the user to not have to pay for tracking at all times, rather only when there is a real need for the GPS tracking services. Further a scheme like this would allow the batteries that power the cellular radio and GPS to be inactive at all times in less the above conditions are met. Normally, GPS systems require high-capacity rechargeable batteries, but with a scheme like this non-rechargeable batteries should be able to be used and lower the overall cost and maintenance of remote sensors.

The alarm device may be configured with the power tamper feature. This feature may help to deter anyone from defeating the system by unplugging the power. The unit may include a battery backup inside that will allow the unit to operate for many hours without any external power. When the unit is armed and an entry delay is active (this would be caused by an intruder passing through any delayed sensor), as steady tone would sound, which is normally there to indicate to the user to disarm the system, but an intruder would try to defeat the system by unplugging the power. At this time the act of removing power from the base would cause the entry delay to expire immediately sending out the alarm to the monitoring center immediately. Thus, when the base unit is unplugged the unit is in a lower state of arm and immediately recognizes a breach in the sensors, which results in an instant alarm. The alarm system then waits for you to turn it off. If the unit is picked up or struck in any manner an alarm sound is instant. Additionally, it should be known that an entry time delay may be preprogrammed for a predetermined time.

The alarm device may be configured with the hot button group to allow the system to be divided into sub-systems and armed or disarmed separately. However in the case of hot buttons the user may be able to configure their system as they see fit instead of relying on an installer. In addition, user attributes may be set to allow or not allow some users access to given Hot Button Groups. The user interface for these Hot Button Groups may be much simpler than traditional alarm systems, simple icons may be used to identify each group. The system may also be configured in such a manner as to allow reports to be sent when each of these hot button groups is armed, disarmed or in alarm. Where each report is sent may be selected by the user and unique to each Hot Button Group as desired.

The hot button allows the user to activate zones or alarms as needed, which allows the user to turn what you want on when you want it on. This allows the user to have minimal sensor placement and activation of each sensor. Thus, the system provides security that you can't interrupt, meaning that a sensor or monitored element cannot be deactivated unless you specifically deactivate it. Therefore, deactivation of alarm system doesn't disarm hot button activated element. The systems handheld activation button may include the ability to program hot button groups for handheld control, which provides another means for activating and deactivating groups or sensors when the user requires such activities. The hot button groups are configured to not be overridden by a jamming element or other such devices nor can they be overridden unless specifically desired and physically done so at the base unit or with the fob. The single button action to activate or deactivate provides flexibility and added security for the user. The hot button groups may include a single sensor or multiple sensors or even groups of sensors.

The user may configure each group by selecting sensors that have been previously learned into system or from sensors that are added specifically for hot button use. Once the sensor has been added the hot button group may be assigned a name that relates to the group of sensors, such as, but not limited to gun safe, liquor cabinet, garage, guesthouse, boat, and outdoor equipment. In addition each group may be assigned a sound that would be used for alarms and chime so users can determine which hot button group is active just by the sound being produced. Again, the ease-of-use and setup of the hot button groups along with the unique ability for transmitting messages and setting sounds, makes the implementation of the feature unique. Thus, if the user has a gun cabinet, jewelry box, liquor cabinet or something that they specifically want monitored the base unit may be programmed to read such element and with a push of a single button may activate specific monitoring of the item of interest. This allows the user to know when the item is being tampered with and will receive a message stating the same as well as an audible alarm may be triggered at the sensor and base unit.

The alarm device may be configured with an auto connect feature. The auto connect feature may include a system program that once power is applied to the unit for the first time, the user will be asked to acknowledge they wish to proceed. At that time, the unit will automatically acquire the strongest cell signal and connect to that provider through the wireless transceiver. No further user action may be required and no phone numbers need to be entered. This feature may be implemented by having the backend preset with information about each of the alarm device units that is specific to that unit through a serial number or other identifying feature and once the unit is powered up for the first time it sends a message to the back end indicating that it is been powered up for the first time. It is this message that starts the billing cycle and remote services as well as provides the user with notification that the system is functioning properly. The use may Auto connect to cell phone and monitoring station to automatically pay for services and order sensors simply by entering credit card information to pay.

In conjunction with feature listed above, the database in the backend may be preconfigured with each unit's account number and central monitoring station (CMS) telephone number. Within the unit itself, all alarm messages and test messages have been preset and sent along to the CMS and the user's previously identified contact number or email address. Therefore, no additional programming by the user is required for a message to be passed along to the monitoring service.

The alarm device may be configured with a sensor central monitoring station (CMS) auto connect feature, which as each sensor is enrolled into the system, a sensor type is assigned as well as a sensor number. These types and numbers are passed along to the CMS as part of any alarm or other sensor transmission. This allows CMS to act upon each message without a database on each sensor being preconfigured. This allows the user to add and change sensors freely without needing to update the database within the CMS.

If a sensor message is being transmitted to an e-mail, short message service (SMS), multimedia message service (MMS) number or other types of text message to cell phone, and/or transmitting an email to the personal computer. The message may contain not only the sensor type but also the sensor name in English or other language as it was entered by the user. In the case of the CMS transmission, the name is not currently being passed along. A feature enhancement can be implemented that would pass along the name to the CMS as well as the other sensor type in sensor number information that is currently being passed. This may be implemented by modifying a message being sent from the backend to the CMS. Industry-standard messages between those systems may be modified to support name transfers.

The communications portion of the device may include a feature for connecting or looping multiple base stations together, such that multiple user alarm systems may check the status of friend users who are specifically entered into the base unit or through a switch at the CMS. This allows the alarm systems to interact on a social media level with specific friend users.

An alarm clock may be configured in the alarm device. This feature may be configured using a button on the home screen of the alarm unit. This button may be of a predetermined configuration and may be either on or off for activating or deactivating the wake-up alarm. The user must go to the setup screen and select the alarm clock button in order to modify the alarm time. When the alarm is set and the time of day matches the time set for wake-up, the unit will start beeping (at a level that was pre-selected) and display the current date, time and buttons to either turn the alarm off or set up for a predetermined snooze time. This feature may be used to energize or de-energize the monitoring features to reduce battery drain.

This feature may be fully integrated into the alarm system. The basic alarm functionality always has priority over the wake-up alarm. Both systems can be used simultaneously without sacrificing any ability of either system.

The alarm system may include an external and remote communication element or sign 200. This feature may work in conjunction with the outdoor sign, much like you would see today in the yard of somebody with alarm system. However, the sign 200 may include the ability to function as an additional transceiver with the ability to communicate with the base unit in a manner that would bring attention to any passerby when the security system was in an alarm state. This may be achieved through flashing lights around and on the sign. The system may include a transmitting element within the base unit, and a receiving element in the sign, which may be connected to a signaling device such as the lights discussed above. A yard sign 200 may allow an emergency worker to find an address more easily. Additionally, the yard sign 200 may include a grid or home layout/floor plan that illuminates to indicate an area of interest for the emergency responder to quickly locate where the alarm was triggered. Additionally, the yard sign 200 may act as a backup if the base unit has been removed or destroyed.

The alarm system may be configured with an anti jamming device that may prevent jamming the transmission of an alarm, location or anything else being transmitted from the alarm system. This feature may be used to detect an intruder's attempt to defeat the system by jamming the GSM frequencies. When such jamming is detected by the modem, a message would be sent to the unit's software that would in turn cause it to sound a local alarm notifying any user on-site and sending a message via some alternative hardwire or wireless means such as WI-FI or Ethernet that the jamming is taking place. Anti jam; Sound warning being jammed; switching to WI-FI.

The alarm system may include the wireless or WI-FI element for connecting to a wireless local area network (WLAN). This feature may include multiple paths of wireless communication. In one case you may have a primary cellular modem and a backup WI-FI modem. Conversely, you may have a primarily WI-FI modem and cellular backup modem. Since most wireless communication modems provide status messages to the host microprocessor, it can determine if the primary communication modem has service, such as communication to the cell tower or a WI-FI hub. At that time the base unit may automatically switch to the backup service. In addition, it could also switch to the backup service whenever a message has failed to transfer using the primary service after a predetermined amount of attempts has been exhausted. The base unit may be pre-activated on the WLAN through the WI-FI modem, through a Bluetooth or other wireless type communication element. Thus, the unit may have connectivity to WLAN or other networks to transmit an alarm or other system signal directly to a user or other specified monitoring device without going through the monitoring station.

When considering the economics of a wireless security system, it would be beneficial to have a primary WI-FI service since there would be no additional cost to the user beyond their normal internet service. The GSM backup could be configured in a manner where user would only be charged when that service is actually used. More than likely, this service charge would be at a higher rate, but since it would be used in rare situations the overall cost savings to an end user may be substantial. The WI-FI service may allow the user to have email monitoring, as well as allow the user to connect to the monitoring station to pay the monitoring fees or order accessories on demand, as discussed above, thus the user only pays for the service or accessories, as needed.

Turning now to the illustrations, FIGS. 1-9 illustrate an exemplary security system for protecting people and/or their property. System 100 generally includes a user premises 102 in communication with a plurality of remote network devices 104 that may include, but are not limited to, a cellular base station (not illustrated), a communication network 108, a personal computer (PC) 110, a network server (not illustrated), and a central monitoring station (CMS) 114. Generally, communication network 108 enables communication from a consumer alarm monitoring base unit 140 with selectively integrated alarm monitoring devices 120 at the user premises 102 to the remote network devices 104, such as PC 110, and the CMS 114, which may be in contact with at least one emergency responder service 106, such as, but not limited to fire, police and ambulance. In the embodiment shown in FIG. 2, the user premises 102 includes a house 116 with an integrated garage, but may also include any combination of property or articles of property such as, for example, a business, apartment, hotel room, storage unit, garage, parking lot, building site, boat, equipment, or any other location and/or personal property.

Figure 2B:
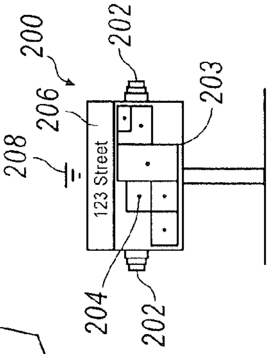
FIG. 2B illustrates an exemplary external and remote communication element or sign.
Figure 2A:
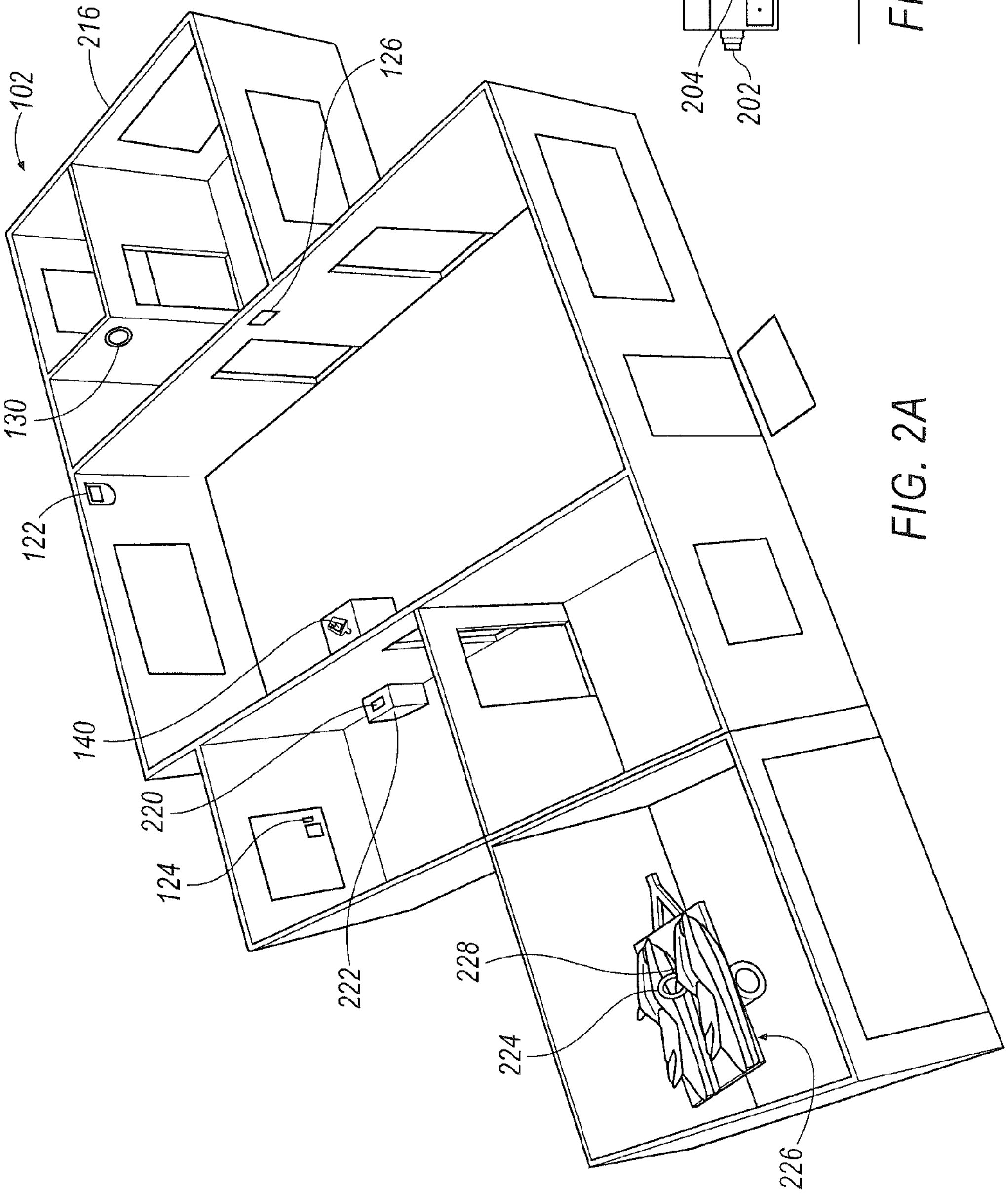
FIG. 2A illustrates an exemplary user premises.
Figure 3:
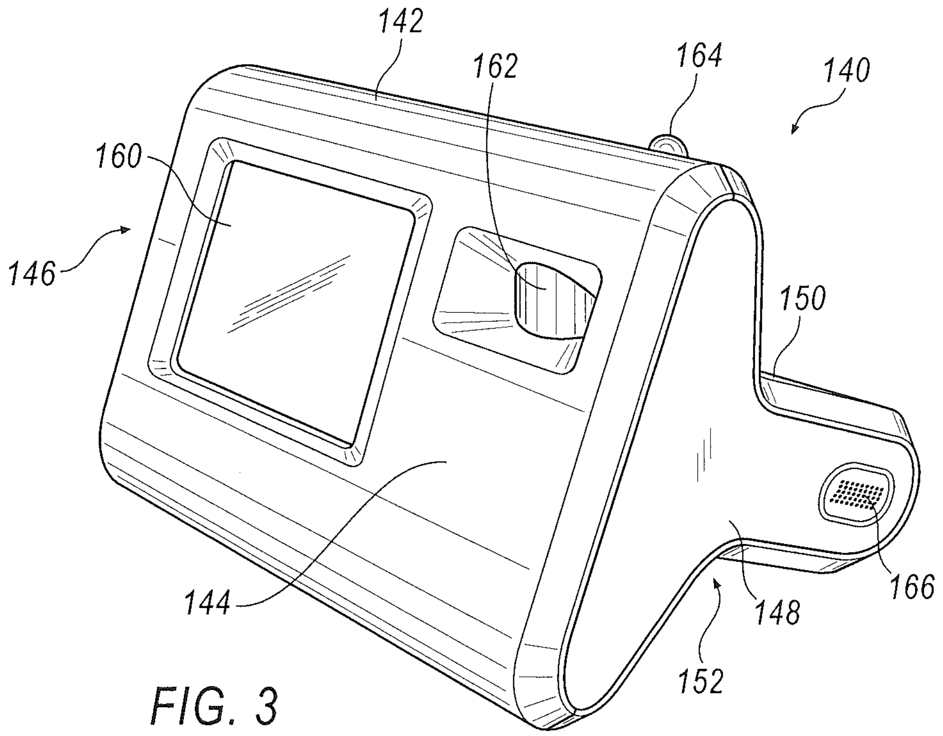
FIG. 3 illustrates an exemplary consumer alarm unit.

The consumer alarm monitoring device base unit 140, which in the embodiment shown in FIGS. 1, 2 and 3 is located on a table in the house 116. The alarm monitoring base unit 140 may be configured in a housing 142 having a front panel 144, a left side panel 146, a right side panel 148, a top surface 150 and a bottom surface 152. The housing 142 may include at least one user interface 160, at least one integrated alarm monitoring device 162 at least one auditory speaker 166 and at least one antenna 164. The alarm base unit 140 may be configured to operate as a stand-alone alarm system having an integrated alarm monitoring device 162 or as an alarm base unit 140 selectively interconnected with a plurality of alarm monitoring devices 120. Alarm base station 140 is a portable alarm device or system that may include multiple base units 140 interconnected via a wireless signal and/or with at least one compact alarm monitoring device 120, for protecting numerous items and various forms of personal property.

The exemplary illustrations of FIGS. 1-3, show various compact alarm monitoring devices 120, which may include a motion sensor 122, a door/window sensor 124, a glass break sensor 126 and a smoke detecting sensor 130. As discussed above, various other sensors may be employed in an exemplary alarm system 100 depending on the application and specific items to be monitored. For instance, with reference to FIG. 2 the exemplary user premises 102 includes a hot button sensor 220 connected to a cabinet 222 for specifically monitoring the contents of the cabinet 222 while other sensors are not monitored, which will be discussed in greater detail below. Additionally, a selectively attachable rattler loop 224 is removably connected to a pair of sport vehicles 226. The rattler loop 224 may include an accelerometer (not illustrated) a tilt sensor, and/or a vibration sensor configured within the sensor housing 228 that that detects movement of the rattler loop 224 and sends an alarm signal to the base unit 140 where it is processed and transmitted to a user 116 or the CMS 114.

System 100 may also include equipment and devices to enable alarm base station 140 and alarm monitoring devices 120 to communicate with other remote devices, such as a portable handheld device 112 or controller 128, and services. Cellular base station (not illustrated) is generally a wireless communication cellular tower connected to a wireless or cellular network. Communication network 108 may include such a cellular network, and may also include various wide area networks (WANs) and local area networks (LANs) depending on the application and/or location of the base unit 140. Generally, communication network 108 enables communication from alarm base unit 140 and alarm monitoring device 120 to other devices, such as PC 110, the handheld device 112, web server (not illustrated), and the CMS 114.

PC 110 is generally any internet connected personal computer. Generally, a user 116 can use PC 110 to monitor user premises 102, configure the base unit 140 and monitoring devices 120, and receive information from any number of different devices within system 100. Additionally, the handheld device 112 may be a cellular or digital phone generally connected to any available network. The handheld device 112 may be configured to monitor and control the base unit 140 and connected monitoring devices 120 wirelessly and receive any information transmitted from the base unit 140.

In one embodiment, the user 116 using PC 110 and handheld device 112 may receive information directly from the base unit 140 or indirectly through an intermediary like the web server (not illustrated) or the CMS 114. In another embodiment, the user 116 may both send and receive information to and from the alarm base unit 140 either directly or indirectly through the use of the PC 110 or the handheld device 112. For example, alarm base unit 140 and alarm may be in communication with the CMS 114, which may in turn communicate with web server (not illustrated). The user 116 using PC 110 or handheld device 112 may communicate with web server (not illustrated) to receive information from the base unit 140 and alarm monitoring device 120, or the user 116 can request configuration changes either through the CMS 114 or directly to the base unit 140, depending on the desired configuration and available network connection.

The CMS 114 provides constant monitoring of the base unit 140 and alarm monitoring device 120 within user premises 102, and provides additional security assistance in response to a security event. For example, central monitoring station 114 may receive periodic updates from alarm base station 122 or alarm monitoring device 120. In the event that such updates cease, central monitoring station 114 may provide various services, such as calling user premises 102 or dispatching the police to user premises 102. Alternatively, as discussed in greater detail below, alarm monitoring device 120 may be configured to determine if it is out of range of base station 122, and respond, for example, by enabling a position tracker. In this exemplary approach, base station 122 or central monitoring station 114 may still provide the various services previously described, or alternatively, the alarm monitoring device 120 may communicate directly with the communication network 108 to request and/or provide the various services.

The base unit 140 may include a wireless communication system (not illustrated) that is configured within the base unit 140 and enables wireless communication between the monitoring devices 120 and the CMS 114 or remote network devices 104, generally using known communication protocols. Wireless communication system is generally secured within the base unit 140, and in electrical communication with a processor (not illustrated) and the user interface 160 to wirelessly communicate with the remote devices 104 and/or CMS 114. Wireless communication system may include the antenna 164 (see FIGS. 3-6, 8-9), and may include both a short-range and a long-range communication device connected with the antenna 164. For example, wireless communication system 132 may include a low power radio, a WI-FI device, a Bluetooth device, or other such short-range wireless communication device. Furthermore, the wireless communication system (not illustrated) may also include a cellular modem for longer-range analog and/or digital communications with various networks using known communication protocols. In one embodiment, the alarm monitoring device 120 may be configured to communicate directly with the CMS 114. Additionally, the alarm system 100 may include a sign 200 that is configured on or adjacent to the user premises 102, which the sign may also be configured with a wireless communication system (not illustrated) configured to communicate directly with the CMS 114 and/or the remote network devices 104 to relay an alarm signal 208 to an emergency responder from at least one of the base unit 140 and the monitoring devices 120.

The exemplary sign 200, illustrated in FIG. 2, may be positioned on a structure 216 of the user premises 102 or some other spot where the emergency responder may easily see the alarm. The exemplary sign 200 may include at list one indicator 202 as well as the premises 102 identifier 206. The indicator 202 may be a visible indicator or illumination element in the form of a flashing light, strobe or other illumination device to provide a marker for the emergency responder to quickly identify. Alternatively, the indicator 202 may also be an audible indicator in the form of a siren or other auditory device. The identifier 206 may be a series of numbers that correspond to the mailing address of the premises, a user 116 telephone number or email address that are preprogrammed into the base unit 140 or into the sign 200. The sign 200 may include a grid 203 that corresponds with a structure 216 floor plan of the user premises 102. The grid 203 may include at least one identifier 204 to show the location of the monitoring device 120 that is sending the alarm signal to the base unit 140 and ultimately to the sign 200. The identifier may be a small light emitting diode (LED) that visible directs the emergency responder to a specific locate within the structure 216 or user premises 102.

The illumination element may include an infrared sensor or at least one conventional light. The conventional light may include at least one of a light emitting diode (LED), an incandescent bulb, and a high-intensity discharge bulb, as the illumination element and/or for indicating a charge state of a battery configured in the sign 200.

In this embodiment, the central monitoring station 114 and/or the remote network devices 104 receives periodic updates from the base unit 140, and in the event that such updates cease, central monitoring station 114 may provide various services, such as calling the customer premises 102 or dispatching the emergency responder to the customer premises 102. Alternatively, alarm base unit 140 may include an anti-theft feature that may include at least one internal motion sensor to determine if the base unit 140 has been moved, and respond by, for example, enabling a position tracker, such as a global position satellite (GPS) transceiver (not illustrated) configured within the base unit 140. Alternatively, an infrared sensor 162, as discussed above, may be included and may be at least one passive infrared (PIR) sensor or detector, which may be used to detect motion through body heat in a general area around the unit, and may be directed to illuminate an area with passive infrared light waves. The sensor may be configured on the housing 142 and/or as the motion detector 122 of the monitoring devices 120. The sensors 162, 122 may be configured to swivel to a predetermined direction depending on the application.

In this exemplary approach, base unit 140 may still provide the various services previously described, or alternatively, the base unit 140 may communicate directly with the communication network 108 to request and/or provide the various services. Accordingly, wireless communication system (not illustrated) can communicate with the monitoring devices 120 located within customer premise 102, and with remote devices 104 through a cellular network and/or through the internet.

The user interface 160 is illustrated as being configured on the front surface 144 and provides the user 116 an input that may include various switches, indicators, and controls. For example, user interface 160 may be a control panel secured within enclosure 124 and accessible to the user 116 of the alarm device through a screen or through the remote network devices 104. The user interface 160 may include a variety of control icons or buttons to activate various predetermined commands within the processor (not illustrated) configured within the housing 142 and in communication with the processor and at least one of a power switch, a loop on/off indicator, a motion detector on/off indicator, various indicator lights, a sensor selection switch, and a numeric or alphanumeric keypad. The terms icon and button are used interchangeably to indicate an activation type of element. The user interface 160 is illustrated as a liquid crystal display (LCD), however other known switches and displays or a combination thereof may be employed, depending on the application and complexity of the alarm monitoring devices 120. The user 116 may use one or more controls to activate/deactivate the base unit 140 and alarm monitoring devices 120, thereby arming and disarming a specific device 122, 124, 126, 130, 220, 226. Furthermore, the user 116 may interact with the processor, which may include various computer programs stored on a memory device (not illustrated) through the user interface 160 to manipulate and activate/deactivate various configuration options, sensors, etc. (as discussed in greater detail below). Alternatively, alarm monitoring device 120 may not include control panel 134, but may be controlled remotely by or through another device, such as a remote control device, such as the computer, 110, a handheld device 112, the key fob 128 or other known remote control device. For example, the processor (not illustrated) and memory (not illustrated) may provide an internal web server as a user interface for a user 116 to configure and control the specific alarm monitoring device 120, remotely.

Figure 4:
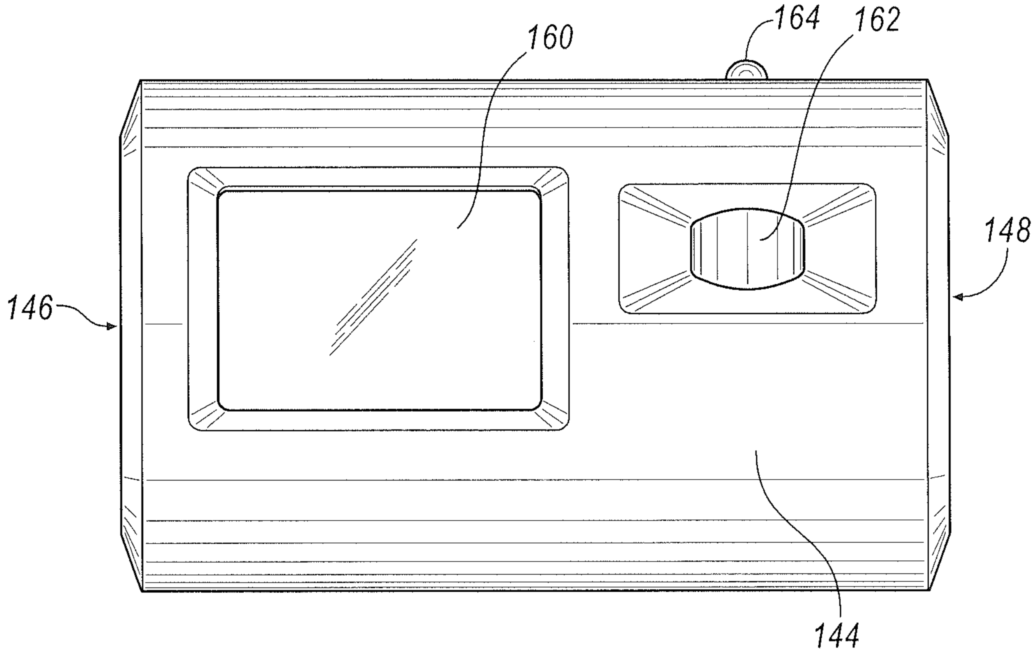
FIG. 4 illustrates a front view of an exemplary consumer alarm unit.
Figure 5:
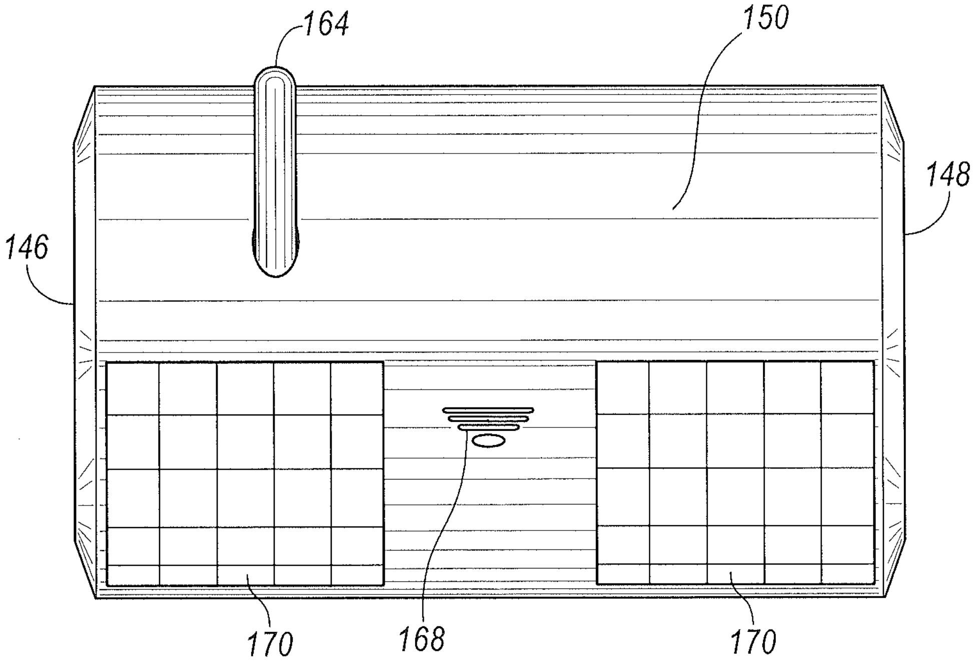
FIG. 5 illustrates a back view of an exemplary consumer alarm unit.

Additionally, with further reference to FIGS. 4-9 various exemplary embodiments of the housing 142 are illustrated. Specifically, FIG. 4 illustrates the housing 142 with the alarm monitoring device 120 configured as an integrated motion sensor 162 on the front surface 144 of the housing 142. It should be known that other alarm monitoring devices 120 may be included, such as, but not limited to, a camera or other previously discussed devices. When a camera is used, the camera may be configured in a top portion 165 (FIG. 9) of the antenna 164. The base unit 140 of FIG. 5 is illustrated with an integrated alarm visual indicator 168 configured on the top surface 150. The alarm visual indicator 168 may be used as an alarm beacon that flashes when an alarm is engaged. Alternatively, the visual indicator 168 may be used as a night-light or auxiliary light for the user 116, which may be activated through the control panel 160. FIG. 5 also illustrates and exemplary power supply in the form of solar panels 170. The solar panels 170 may be interconnected to a battery configured within the housing 142, and may provide an alternative power source to the base unit 140 to recharge the battery or provide instantaneous power to the base unit 140 when an AC or DC power source (not illustrated) is unavailable.

Figure 6:
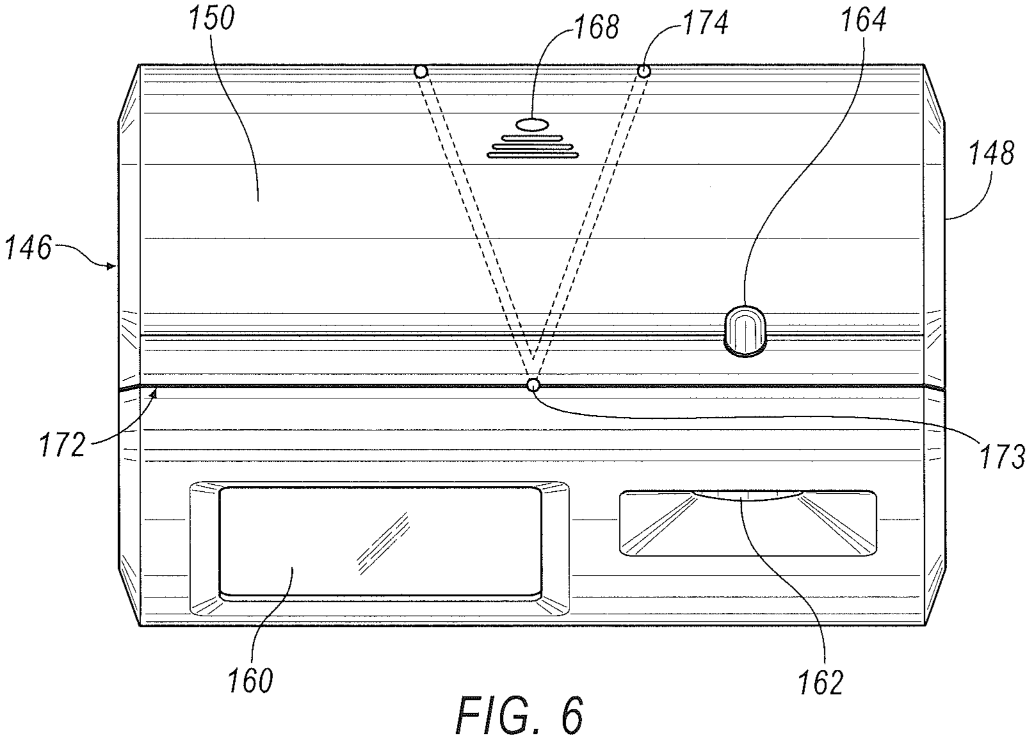
FIG. 6 illustrates a top view of an exemplary consumer alarm unit.
Figure 7:
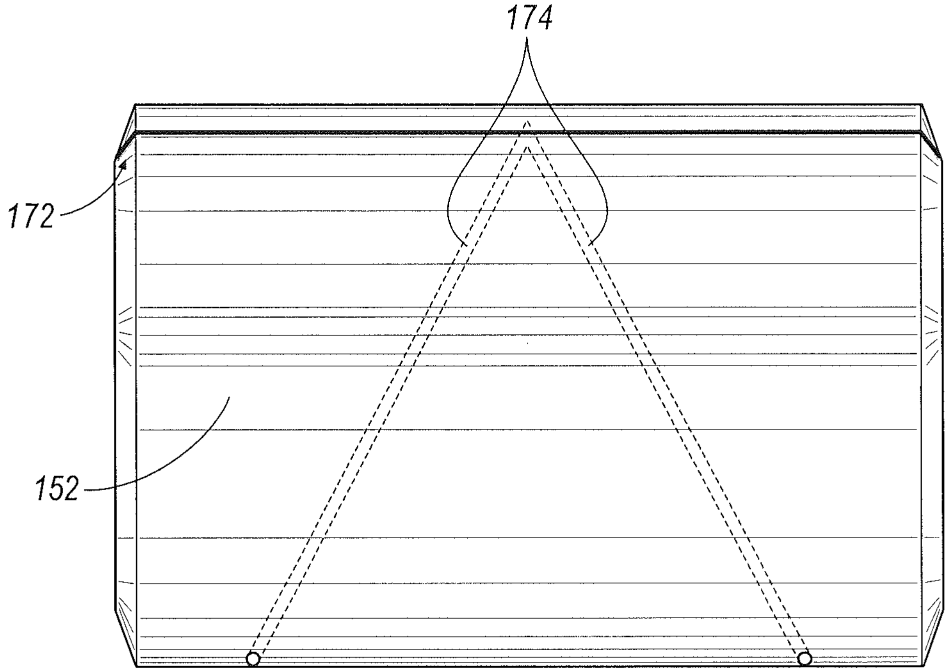
FIG. 7 illustrates a bottom view of an exemplary consumer alarm unit.

As illustrated in FIGS. 6 and 7, the exemplary housing 142 may include features for preventing fluid damage to the internal components. The feature may include an external fluid drain 172 positioned on the top surface 150, the fluid drain 172 may be configured to direct a fluid from the top surface 150 of the housing 142 to an internal fluid path 174 configured internal to at least one of the top surface 150 or the bottom surface 152. The fluid drain 172 and fluid path 174 may be included as a safety feature configured to prevent water or other fluid contaminant from damaging the internal components in an attempt, by an intruder, to override the base unit 140 and prevent transmission when an alarm event is activated.

Figure 8:
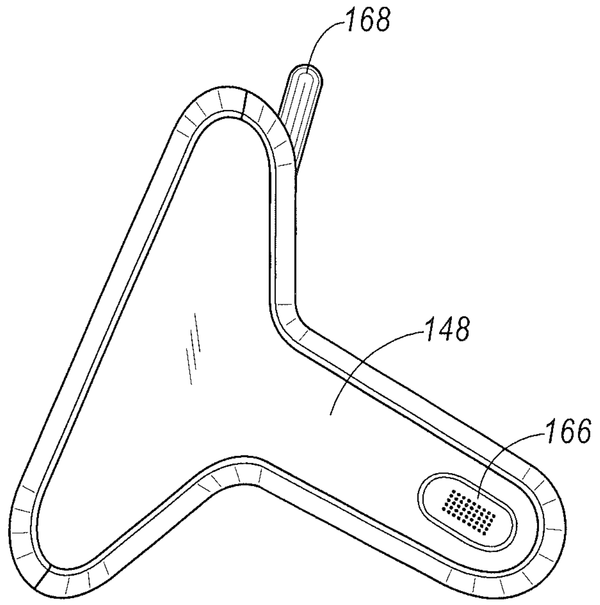
FIGS. 8 and 9 illustrate side views of an exemplary consumer alarm unit.
Figure 9:
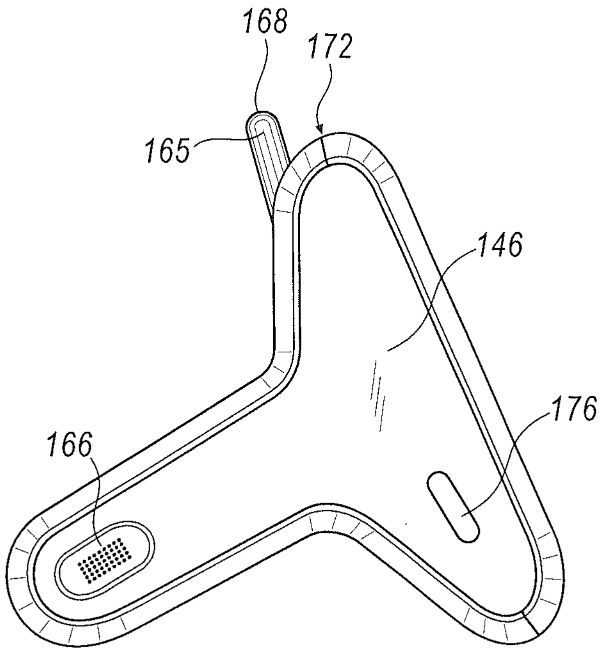

With additional reference to FIGS. 8 and 9, the exemplary base unit 140 include a speaker outlet 166 configured on both the left side 146 and the right side 148 of the housing 142. The speaker outlet 166 may be configured to house at least one loud sounding device, such as, but not limited to a piezoelectric sound generating type device, may be used alone or in combination with the illumination element to alert the user 116 when motion or an alarm has been detected. Additionally, with specific reference to FIG. 9, the housing 142, as discussed above, a media card slot 176 is included. The media card slot 176 is configured to receive any known media and may provide additional memory for the processor. The media card slot 176 may be configured to receive and firmware or software update to the processor for changing, modifying or updating the program for operating the alarm system 100. Exemplary media configured to be received in the media card slot 176 may include, but are not limited to Secure Digital (SD) memory cards such as Micro SD and Mini SD, or other known memory card media. However, it should be known that updating may take place through the use of the communications system and communications network 108.

Figure 10:
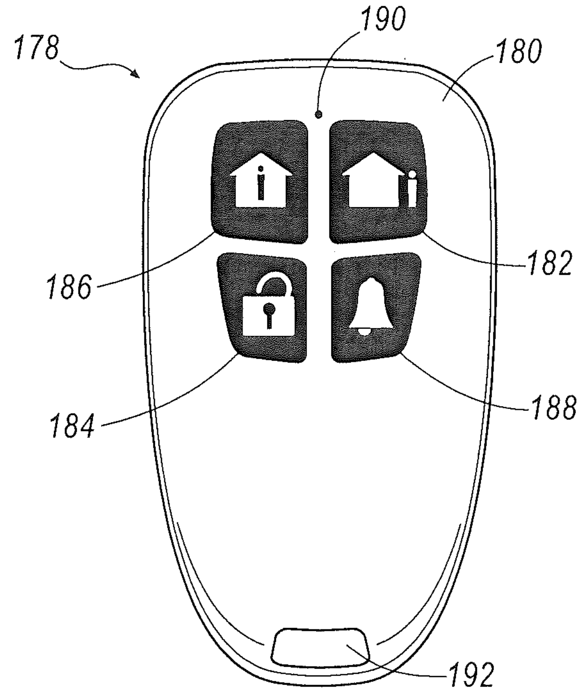
FIG. 10 illustrates an exemplary handheld remote control device for a consumer alarm unit.
Figure 11:
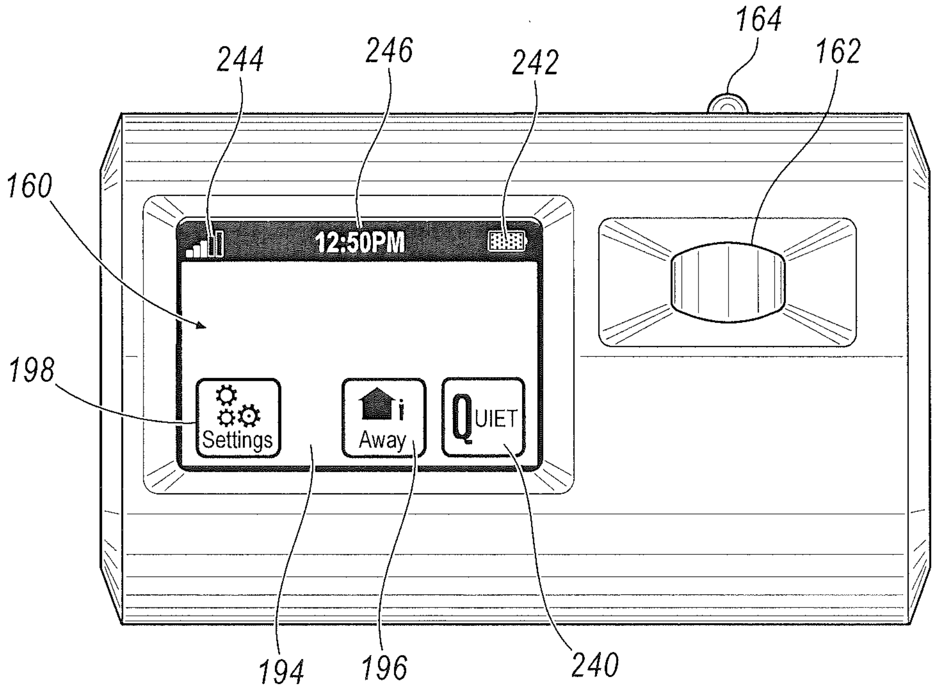
FIG. 11 illustrates an exemplary consumer alarm unit displaying an exemplary home screen.
Figure 12:
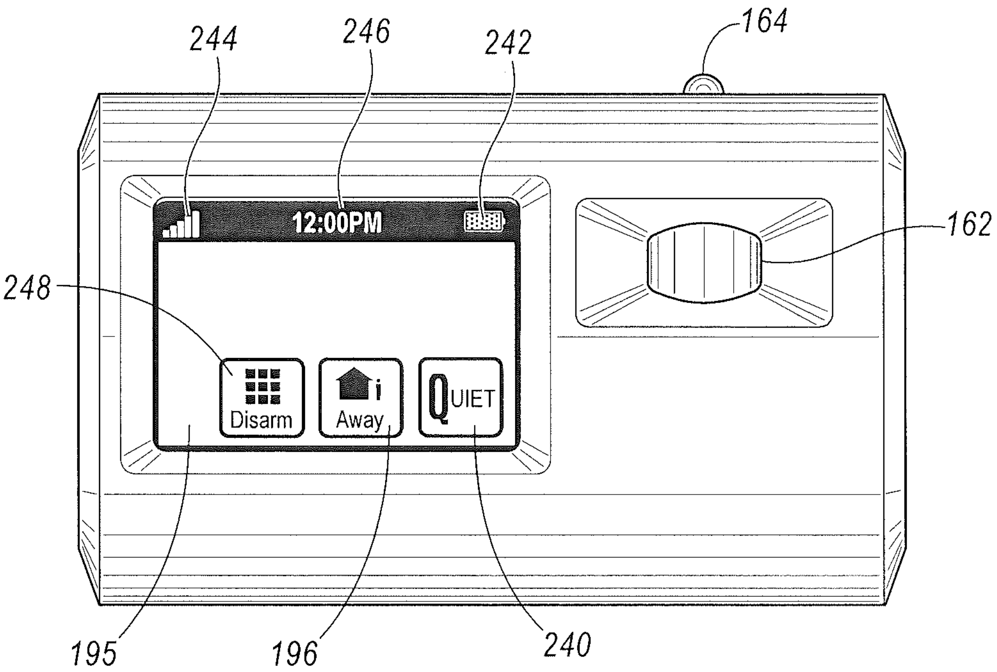
FIG. 12 illustrates an exemplary home screen on a consumer alarm unit.

FIG. 10 illustrates an exemplary handheld remote device 104 in the form of an exemplary key fob 178. The key fob 178 may include a plurality of buttons configured in a handheld housing 180. As illustrated, the key fob 178 includes an away arm button 182 for arming the alarm system 100 when the user 116 leaves the user premises 102 or a home arm button 186 for arming the system 100 when the user 116 stays inside the premises 102. The key fob 178 also includes a disarming button 184 and a chime button 188 for activating and deactivating the base unit 140 chime. Additionally, it should be known that the remote network devices 104 and the control panel 160 may include similar activation and deactivation buttons to control the alarm system 100. When using the key fob 178 an indicator light 190 in the form of an LED or other type of light may be used to indicate when the button 182, 184, 186, 188 is depressed. The key fob 178 housing 180 may include a through aperture 192 for attaching the key fob 178 to a carrying device (not illustrated), such as, but not limited to a key chain or lanyard.

In operation the alarm system 100, as discussed above, may be armed or disarmed using the control panel 160, the PC 110, the portable handheld device 112 and the key fob 128, 178. For discussion purposes the control panel 160 and key fob 178 will be discussed in greater detail below. An initial set-up of the base unit 140 may include connecting the base unit 140 to a power cable (not illustrated) to a conventional AC plug receptacle. The base unit 140 will automatically illuminate the control panel 160 and the user 116 will enter at least one contact number or email for the unit to wirelessly connect. The user 116 may add a plurality of alarm monitoring device 120 or use the integrated motion sensor 162. Turning to FIGS. 11-39, the motion sensor 162 is configured on the front 144 of the housing 142 and is in communication with the power source and the processor, as discussed above. The control panel 160 is also configured in the front 144 of the housing 142, and may include a power indicator 242, a communications network 108 signal strength indicator 244 and a local time clock 246. The power indicator 242 illustrates the battery power available at any given moment and may indicate the source of the power, such as, but not limited to battery, AC, and solar.

Figure 13:
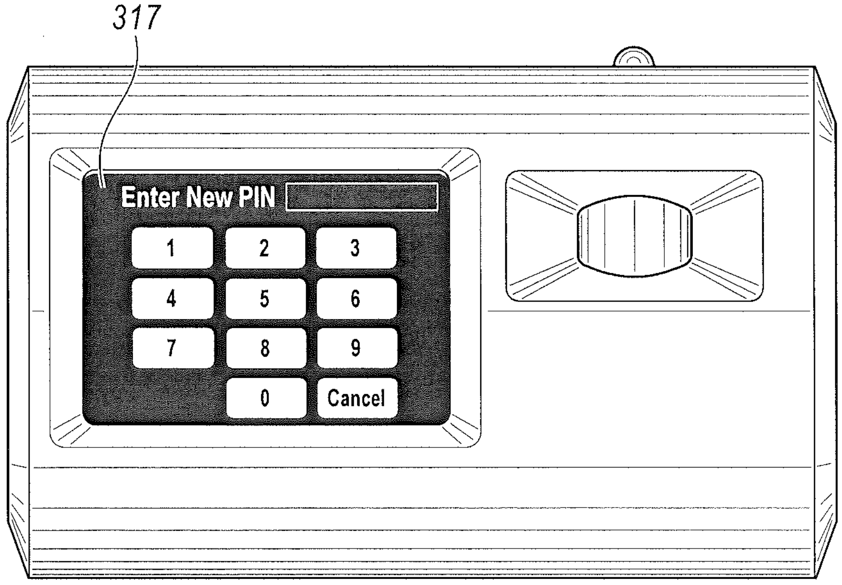
FIG. 13 illustrates an exemplary screen on an exemplary consumer alarm unit for new PIN entry.

Additionally, the control panel 160 may include various functional icons or buttons, such as a quiet button 240, away button 196 and a settings button 198. This specific display may be referred to as the home or arming screen 194. Arming the alarm system 100 may include depressing the away button 196, 182 on either the control panel or the key fob. A predetermined time may be programmed in the processor/memory to allow the user 116 a specific time to leave the premises 102 after arming and time to enter the premises 102 before disarming. Additionally, the exemplary control panel 160 includes the quiet button 240, which may be depressed to eliminate any noise from the control panel 160. Thus, for peace and quiet, push the quiet button 240. The base unit 140 includes a settings button 198 for quick access to set-up the alarm system 100. Once the settings button 198 is depressed the base unit 140 asks for a personal identification number (PIN) to activate/deactivate individual buttons. Disarming the alarm system 100 occurs once movement is detected by the built in motion sensor 162, which triggers a timer allowing the user 116 a predetermined entry time prior to selecting the disarm button 248 on the disarm screen 195, which may require the user 116 to enter a predetermined code into a key pad 317 on an alpha numeric key pad screen 316 (FIG. 13). Alternatively, the user may also select the unlock button 184 on the key-fob. It is also contemplated that the portable base unit 140 may include a scanner (not illustrated) to scan or read a distinct and preprogrammed finger print or retinal signature, thus allowing the alarm system 100 to be disarmed.

Once the alarm system 100 is disarmed, the base unit 140 reverts back to the home screen 194 where the user 116 may select the settings button 198 to activate or select one of the many options, which appear on a settings screen 250 and will be discussed in greater detail below. These options may include selection of a PIN edit button 252, an alarm activation button 254, a chime on/off button 256, an anti-theft button 258, a user button 260, a features button 262, a hot button 264, a sensors button 268 and a back button 270.

Activating the anti-theft button 258, may aid in the prevention of someone stealing the base unit. The anti-theft button 258 may be interconnected to the motion sensor 162 or the internal movement detectors or vibration sensors, as discussed above and discussed in greater detail below. When activated, the anti-theft button 258 activates an alarm when the base unit 140 is moved or hit. The anti-theft button 258 is intended to provide additional security when the base unit 140 is not in an away mode (i.e., the alarm system is not activated). Thus, the alarm system 100 is not armed, but the anti-theft button 258 is armed. If the base unit 140 is moved, an audible tone will be transmitted through the speakers 166 until movement stops.

The user 116 may add or delete user information by selecting the PIN # edit button 252. The user may set or activate the alarm clock through the alarm button 254 or the user may select chime on/off button 256 to eliminate an audible tone that is made when touching or selecting the individual buttons on the control panel 160. Selection of the back button 270 takes a user 116 back to the previous home screen 194.

Figure 15A:
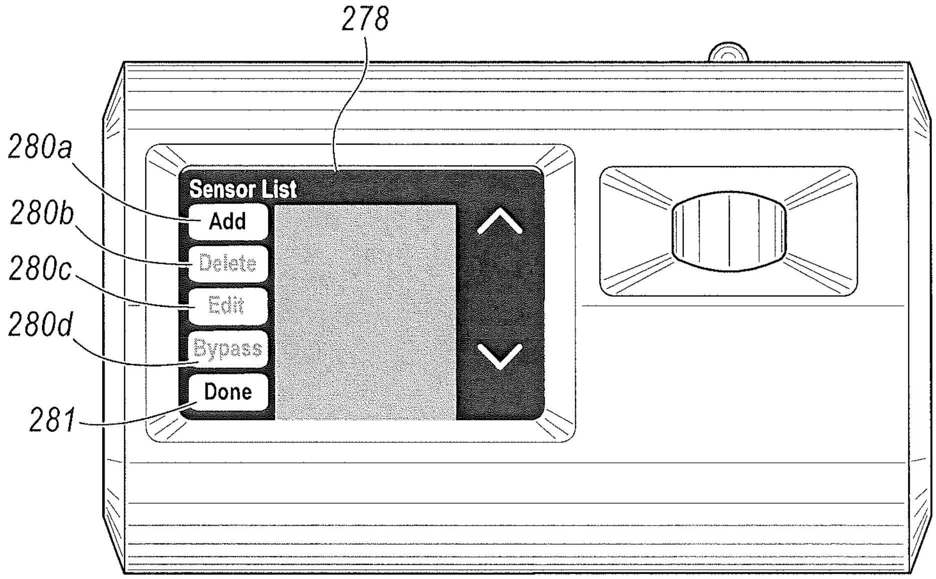
FIG. 15A illustrates an exemplary screen on an exemplary consumer alarm unit for addition of sensors.
Figure 15B:
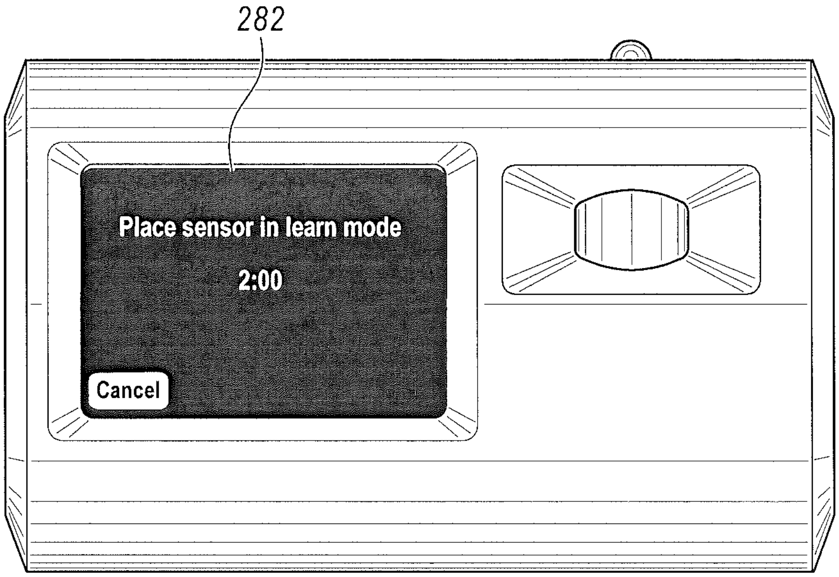
FIG. 15B illustrates an exemplary learn mode screen on an exemplary consumer alarm unit.
Figure 15C:
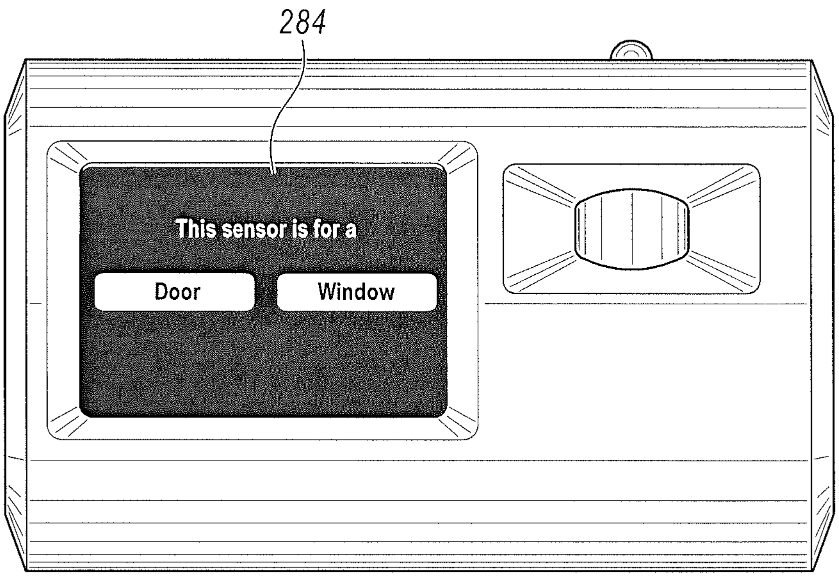
FIG. 15C illustrates an exemplary sensor identifier screen on an exemplary consumer alarm unit.
Figure 15D:
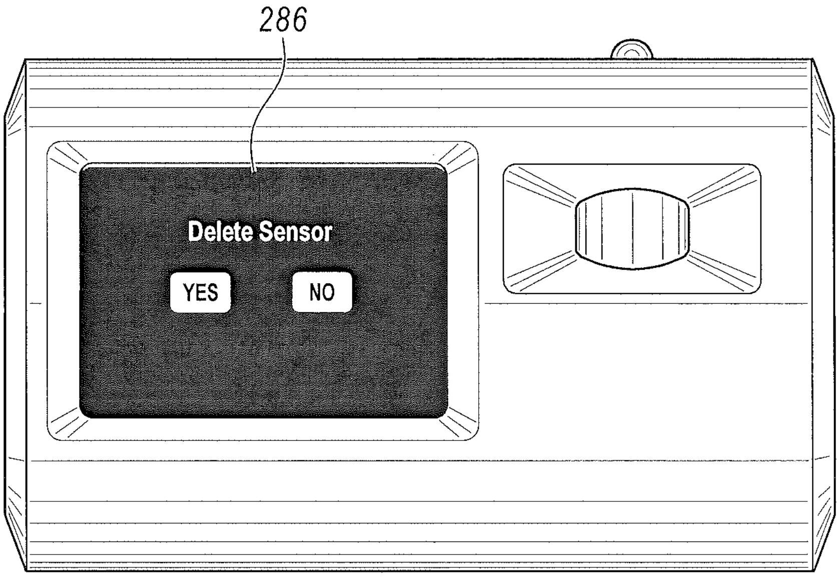
FIG. 15D illustrates an exemplary screen on an exemplary consumer alarm unit for deletion of sensors.
Figure 16:
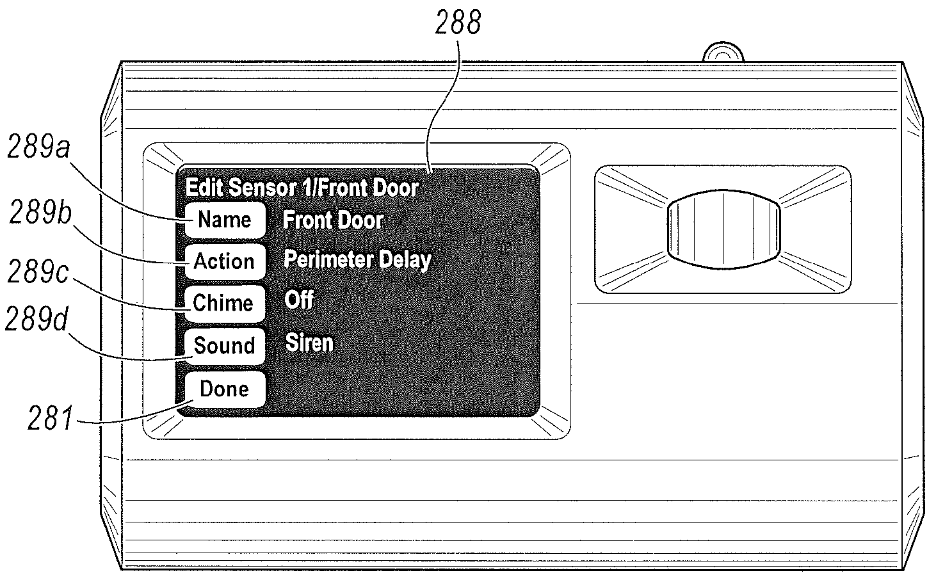
FIG. 16 illustrates an exemplary screen on an exemplary consumer alarm unit for modification of sensors.

The user 116 may manage and add various alarm monitoring devices 120, such as, but not limited to, door and/or window contact sensors 124, glass break sensors 126, motion sensors 122 and smoke detectors 130, by selecting the sensors button 268, which reveals a sensor list screen 278. The sensor list screen 278 may include an add button 280A, a delete button 280B, an edit button 280C, a bypass button 280D and a done button 281. It should be noted that prior to adding a one of the monitoring devices 120, the delete button 280B, the edit button 280C and the bypass button 280D are not available. Pushing the add button 280A reveals a learn mode screen 282 and allows the user 116 a predetermined time, as illustrated in FIG. 15B, to depress a learn button (not illustrated) on the respective monitoring device 120. Once the learn mode is complete, the base unit 140 will sound a chime to confirm that the monitoring device 120 signal has been recognized.

Additionally, a sensor identifier screen 284 (FIG. 15C) may be revealed to allow the user 116 to select a specific label for the enrolled monitoring device 120 to appear on the sensor list 278. For example, when the monitoring device 120 is being selected between a door and window contact sensor 124, the user may specify that the sensor 124 is positioned in the front, back or on a garage of the user premises 102. The sensor 124 may be designated by a specific alarm sound that is specified for each monitoring device 120. This allows the user 116 to recognize a specific breach as the selected sound may repeat a predetermined amount before the alarm system 100 siren begins. This provides an audible recognition of which monitoring device is specifically tripped. Once the specific monitoring device is listed on the sensor list 278, the user is allowed to modify the sensor by performing one of the previous listed button, such as, but not limited to deleting the sensor by selecting the delete button 280B, which reveals a delete confirmation screen 286, illustrated in FIG. 15D.

Editing the monitoring device 120, allows the user 116 to change the name, action, chime or sound of a monitoring device 120. As discussed above, and after the monitoring device 120 is added, the edit button 280C becomes active and once selected reveals a specific edit screen 288 (FIG. 16) for a specific monitoring device 120. The edit screen 288 allows the user 116 to delete or edit the name of the monitoring device 120 by selecting the name button 289A which reveals an alpha numeric keypad (FIG. 25B or 39) that allows the user 116 to enter a specific name or title for the monitoring device 120. Selecting the action button 289B allows the user 116 to modify the monitoring device 120 type by selecting, from a predetermined list, an action button, such as, but not limited to a perimeter delay, perimeter instant, interior instant, interior delay, outdoor instant, outdoor delay, smoke detector, police panic, medical panic, holdup button, water alarm, low temp, high temp, and gas alarm which sets the how the monitoring device 120 is activated. The chime may also be turned off or on by selecting the chime button 289C, while the operator may also select a specific sound for the selected monitoring device 120, such as, but not limited to a siren, gong, bell, etc. Once the user 116 has made the desired selections, the user may select the done button 281 to accept all changes.

Alternatively, the monitoring device 120 may be bypassed when the user 116 would like to have the specific monitoring device 120 ignored through one arm/disarm cycle. For example, the user 116 would like to have a window sensor 124 open while the window is open, but would like the rest of the alarm system 100 armed, the user 116 can select the bypass button 280D. Once the bypass button 280D is selected, a bypass screen (not illustrated) is revealed, which allows the user 116 to select the specific monitoring device 120, while that device is highlighted, select a separate bypass button (not illustrated) to bypass the device 120.

Figure 17:
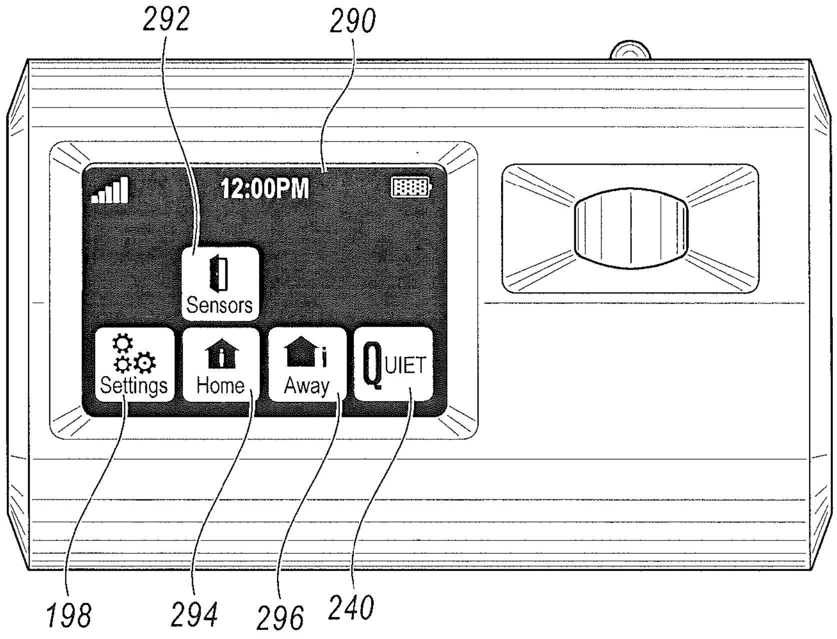
FIG. 17 illustrates an exemplary sensor home screen on an exemplary consumer alarm unit with a sensors button/icon.
Figure 18:
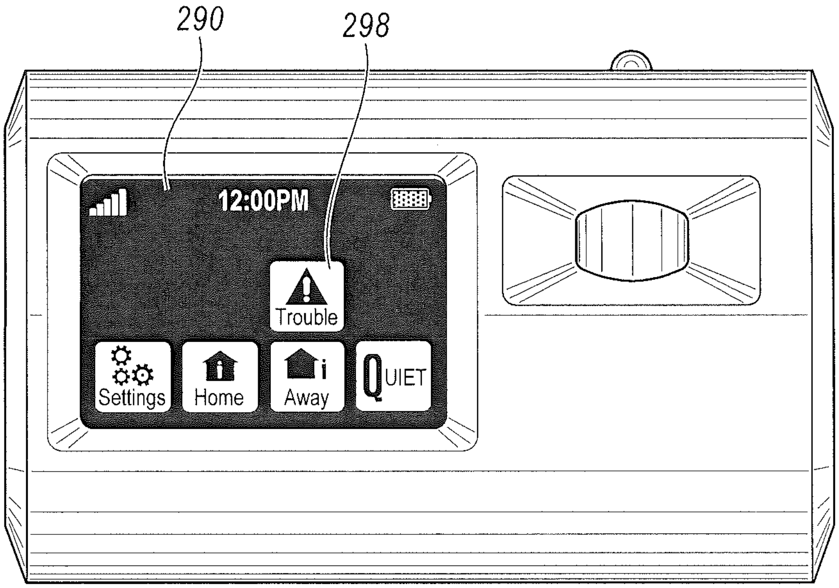
FIG. 18 illustrates an exemplary sensor home screen on an exemplary consumer alarm unit including a sensor trouble button/icon.
Figure 19:
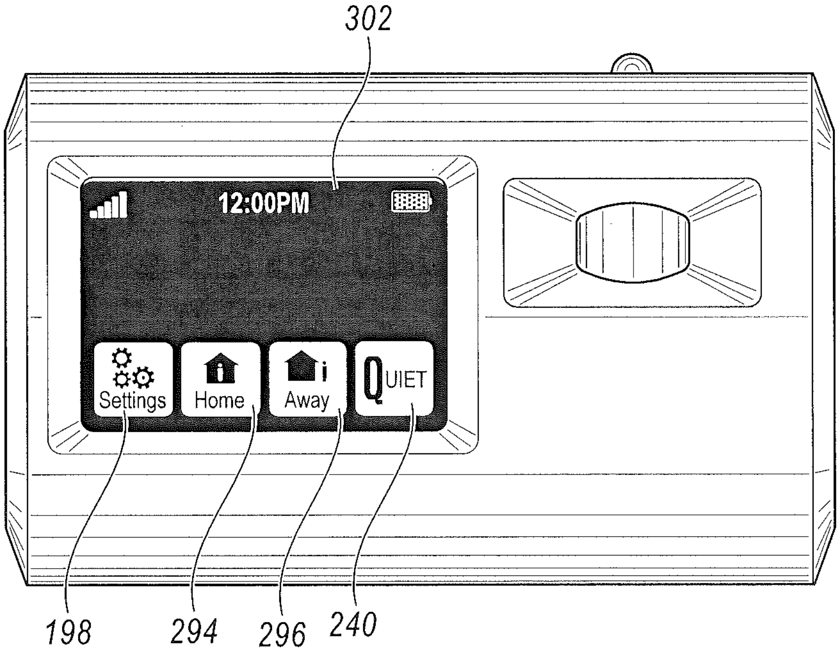
FIG. 19 illustrates an exemplary home screen on an exemplary consumer alarm unit.
Figure 20:
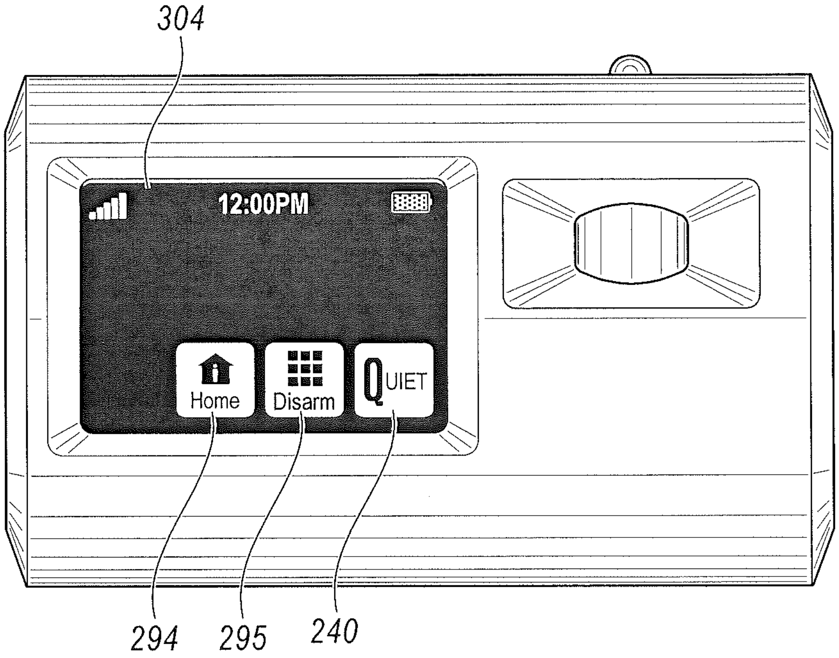
FIG. 20 illustrates an exemplary disarm screen on an exemplary consumer alarm unit.
Figure 21:
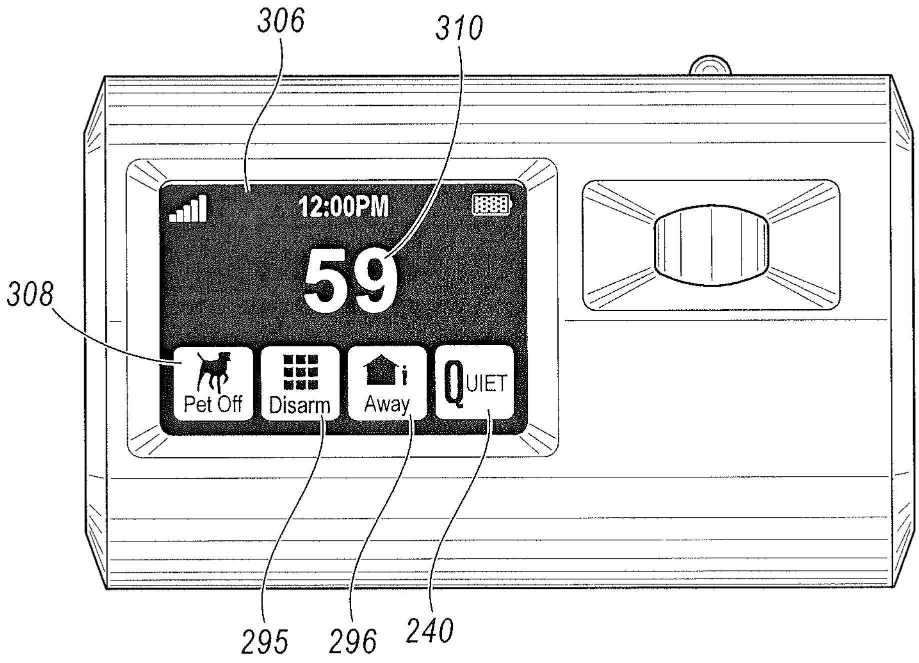
FIG. 21 illustrates an exemplary screen on an exemplary consumer alarm unit in pet mode.
Figure 22:
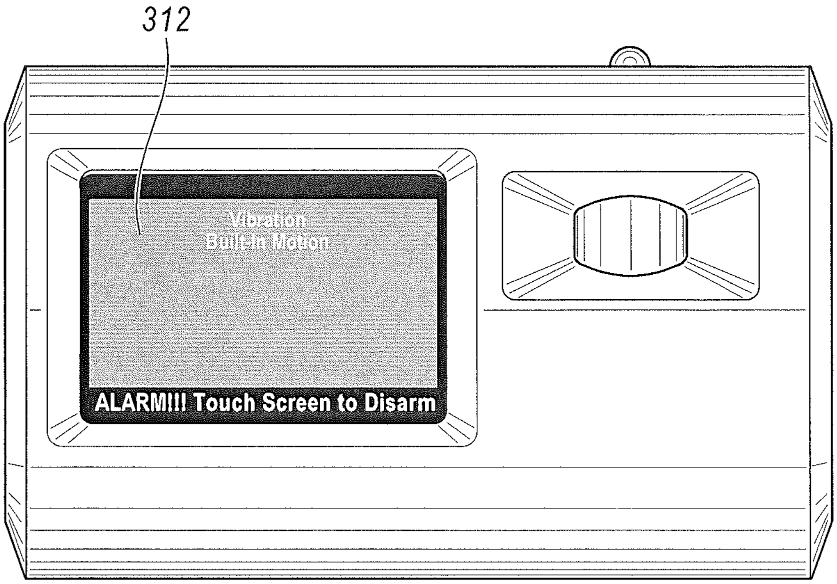
FIG. 22 illustrates an exemplary alarm screen on an exemplary consumer alarm unit.

Additionally, FIGS. 17 and 18 illustrate a sensor home screen 290, which may include a sensors button/icon 292 (FIG. 17), a home button/icon 294, an away button/icon 296 along with the settings button 198 and the quiet button 240. A sensor trouble button/icon 298 may also be included to inform the user 116 of problems with a specific monitoring device 120. The sensor button 292, when selected, indicates open monitoring devices 120, while the trouble button 298, when selected, indicates specific monitoring devices 120 with a trouble condition. Selecting one of the sensor button 292 and the trouble button 298 reveals a separate list screen, similar to list screen 278, which shows all present monitoring device 120 conditions, such as, but not limited to open/closed, low battery, lost, tamper and bypassed.

Monitoring devices 120 may include one or more devices for detecting different types of security events such a motion detector to detect potential intruders near alarm system 100. Generally, a motion detector 122, 162 is adapted to monitor a zone outside of the detector 122, 162. The motion detector sensor 122, 162 may use any number of different technologies including passive infrared (PIR), ultrasonic, and microwave. Additionally, the internal vibration sensor (not illustrated) may detect movement through the use of one or more of the following devices: a tilt sensor, a vibration sensor, or an accelerometer. The internal vibration sensor may be, but is not limited to a mechanical or micro-electromechanical (MEM's) based sensor, which may be used to generate an instant alarm if the base unit 140 or other equally equipped remote monitoring device 120 from the alarm system 100 is picked up while the base unit 140 and corresponding monitoring device 120 is armed. Further, the motion sensors 122, 162 may also be used as a method to turn on the illumination element 168. The sign 200 may also include such internal vibration sensor or motion sensor 122, 162 to prevent the sign 200 from being removed or disabled.

Monitoring devices 120 may also monitor environmental conditions through a heat sensor, smoke detector, a digital thermometer, a rain gauge, a glass breaking sensor, etc. Monitoring devices 120 may also provide audio and visual feedback from the area around the monitoring device 120 through the use of a microphone and/or video camera or webcam that may be included with the monitoring devices 120. Furthermore, monitoring devices 120 may include be configured with transceivers allowing wireless communication with the base unit 140 through wireless communication system. In response to the monitoring devices 120 triggering a security event, an audible alert results in the base unit 140. Moreover, the monitoring devices 120 may, directly or indirectly, enable the GPS transceiver, configured within the base unit 140, in response to the security event, and/or transmit messages to the base unit 140, central monitoring station 114, or any other device. For example, triggering the security event includes the alarm monitoring device 120, the base unit 122, or the central monitoring station 114 transmitting SMS, MMS, or another types of text message to a remote network device 104, such as the portable handheld device 112 and the PC 110.

The alarm system 100 may include specific arming options starting with a home screen 302 that may include the home arm button/icon 294, the away arm button/icon 296 along with the settings button 198 and the quiet button 240. If the user 116 is staying home and would like the alarm system 100 to monitoring the user premises 102 the user may select the home arm button 294, which arms the system 100 instantly with an armed premises 102 perimeter while all interior monitoring devices 120 may be disabled. Additionally, as discussed above, the user 116 may select home arm button 186 on the key fob 128, 178. Disarming the alarm system results by the user 116 selecting the disarm button 295 on the disarm screen 304 and entering the predetermined PIN # into the key pad 317 on the alpha numeric key pad screen 316 (FIG. 13). Alternatively, the user 116 may elect to disarm the system using the key fob 128, 178 by pressing the unlock button 184. When activating the home arm button 186 in the instant mode, the base unit 140 will be armed while the interior monitoring devices 120 will be disarmed, while the perimeter monitoring devices 120 may be armed with normal delays. Additionally, when activating the away arm button 182 in the instant mode, all monitoring devices 120 will be activated and the user 116 will have the normal entry and exit delay times.

Additionally, the alarm system 100 may include a pet mode 306 (FIG. 21) that allows the user 116 to leave pets or people on the user premises 102. The pet mode 306 may be selectively activated by pressing the away arm button 296, which triggers the exit time arming countdown 310 and provides time for the user to then press the pet off button 308. Pressing the pet mode button 308 during the arming countdown timer 310 changes the pet mode button 308 to read pet on and disarms the interior monitoring devices 120 and at least one entry door, while the remaining perimeter monitoring devices are armed. The disarming of the entry door allows for re-entry into the premises 102 without tripping the monitoring devices 120, thereby preventing an alarm signal from being sent to the base unit 140.

It should be known that the alarm system 100 may include an instant mode that is activated by pressing the home arm button 186 or the away arm button 182 on the key fob 178 twice. The instant mode may provide and instant alarm where the base unit 140 motion sensor 162 sense movement. The instant mode may be disabled by pressing the unlock button 184 on the key fob 178.

In the event that an alarm event is triggered, an alarm screen 312 (FIG. 22) is activated and a list of the monitoring device 120 that has been tripped may be listed on the screen 312. The siren will sound for a predetermined time and the visual indicator 168 will illuminate until the alarm system 100 is disarmed, as discussed above. Additionally, at least one of a text or an email notification will be sent to the predetermined contact address, the message may contain the name of the alarm in the subject and the tripped monitoring device 120 may be included in the message that an alarm has been registered. Additionally, the base unit 140 may also send a message to the CMS 114 when professional monitoring is used.

Figure 23A:
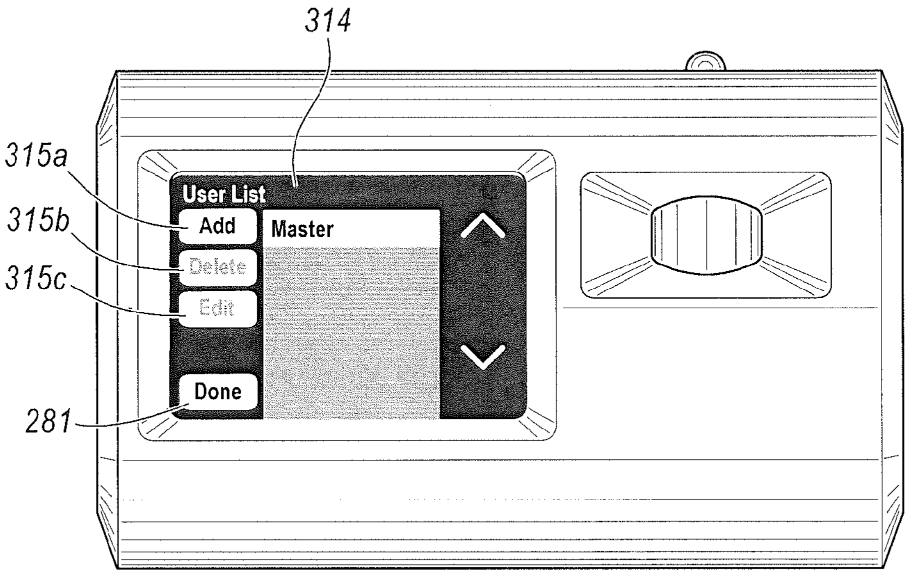
FIG. 23A illustrates an exemplary screen on an exemplary consumer alarm unit displaying a list of users.
Figure 23B:
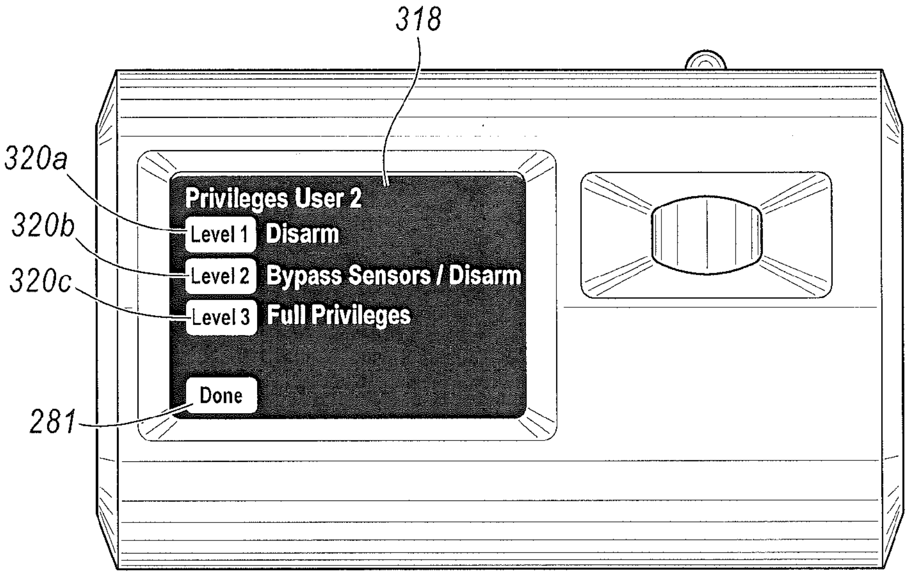
FIG. 23B illustrates an exemplary screen on an exemplary consumer alarm unit for modification of user permissions.
Figure 23C:
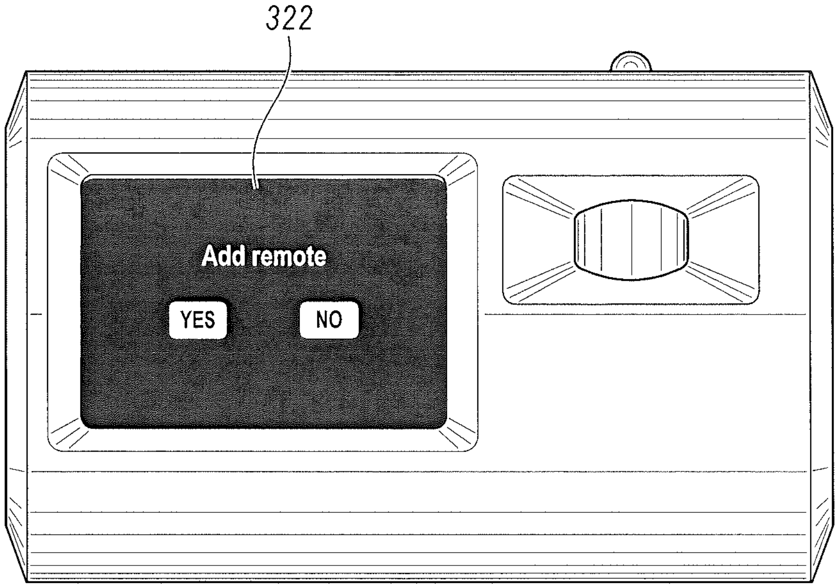
FIG. 23C illustrates an exemplary screen on an exemplary consumer alarm unit for addition of remote.
Figure 23D:
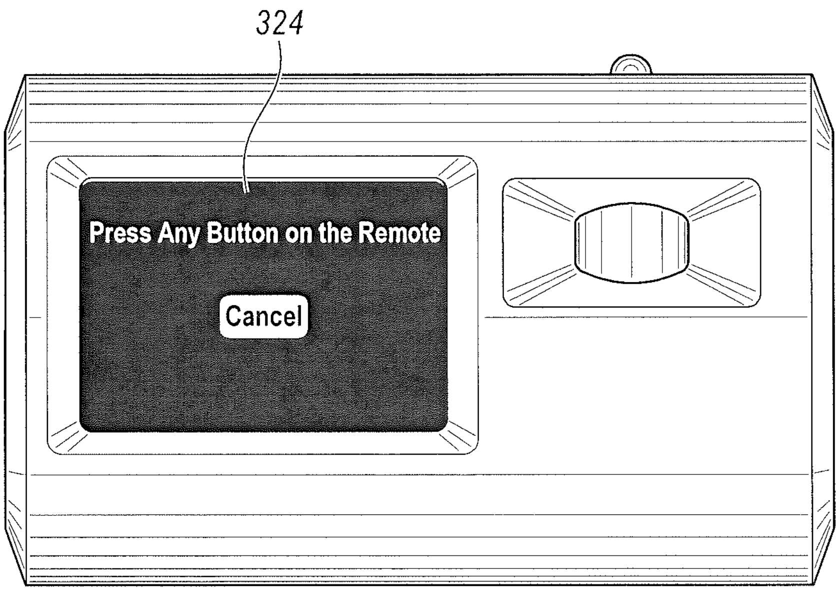
FIG. 23D illustrates an exemplary screen on an exemplary consumer alarm unit for addition of remote network device.
Figure 23E:
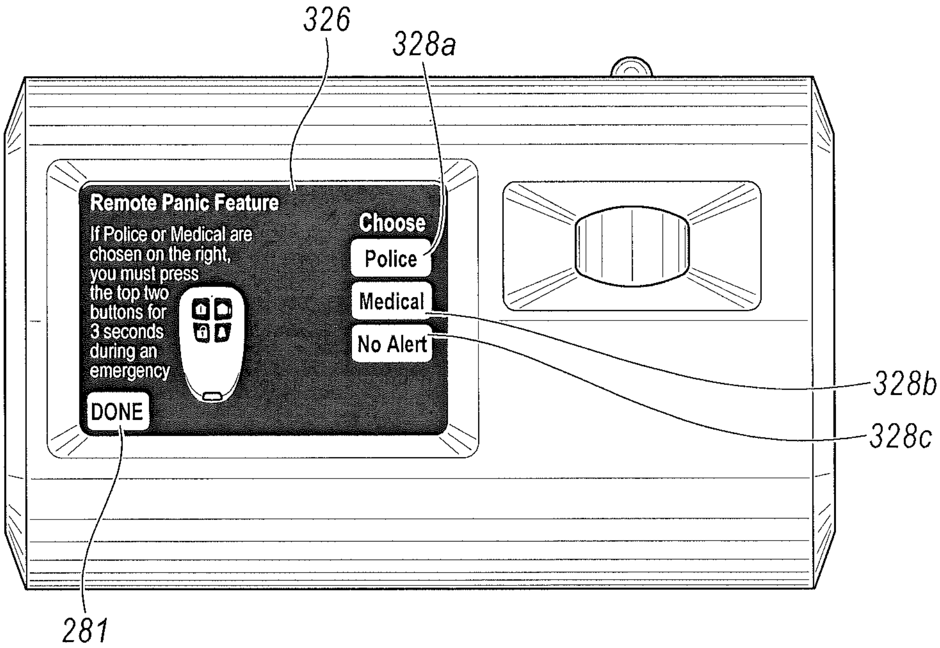
FIG. 23E illustrates an exemplary panic feature screen on an exemplary consumer alarm unit.

As discussed above, the settings screen 250 may include the users button 260, which when selected allows the user 116 to access a user list 314 (FIG. 23A), the user list 314 may include an add button 315A, a delete button 315B, an edit button 315C and the done button 281. Selecting the add button 315A guides the user 116 through entering the PIN # into the key pad 317, which directs the user 116 to a privileges screen 318 (FIG. 23B). The privileges screen 318 may include a first level 320A, which allows the user 116 to only disarm the alarm system 100, a second level 320B, which allows the user 116 to bypass sensors and disarm the alarm system 100, and a third level 320C, which allows the user 116 full privileges. It should be known that other privilege levels may be employed and the three levels are merely exemplary. Additionally, once a new user 116 is added the alarm system 100 may be configured to add a remote network device 104 for each user 116 listed in the user list 318. The alarm system 100 will redirect the user 100 to an add remote screen 322 (FIG. 23C), which allows the user to add an additional network device 104 by selecting yes or the user 116 may choose not to add the additional network device 104 by choosing no. Adding the remote network device 104 requires that a button on the device 104 be depressed after the yes button has been selected, as indicated on the remote network device activation screen 324 (FIG. 23D). The base unit 140 will chime when the new remote network device 104 has been successfully added.

Upon activation, a panic feature screen 326 (FIG. 23E) may be provided where the user 116 may select a specific button to be used in conjunction with the emergency responder. Specifically, the user 116 may select from a police button 328A, a medical button 328B or a no alert button 328C for the remote network device 104 panic features. Once each button on the remote network device has been assigned or not assigned, the user 116 may select the done button 281. Additionally, it should be known that the only buttons available to be assigned a panic feature are the home arm button 186 and the away arm button 182. The user 116 must hold the respective button 182, 186 down for a predetermined time limit in order to alert the police and medical emergency responder.

Figure 23F:
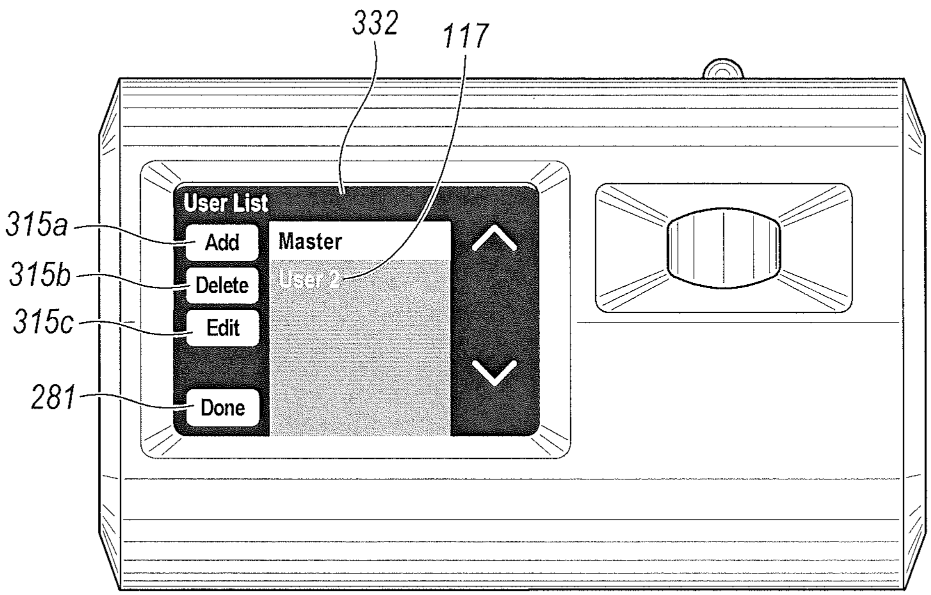
FIG. 23F illustrates an exemplary screen on an exemplary consumer alarm unit displaying a list of users.
Figure 23G:
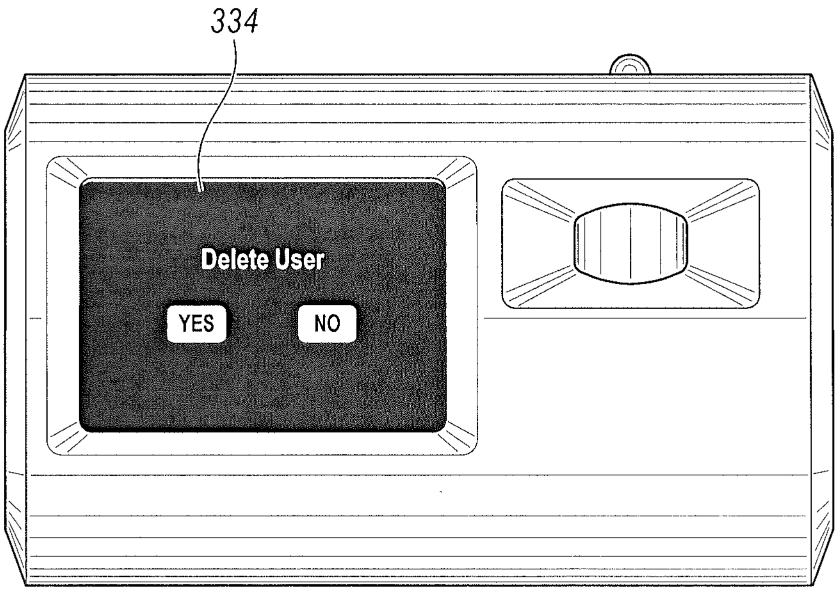
FIG. 23G illustrates an exemplary delete user screen on an exemplary consumer alarm unit.
Figure 24A:
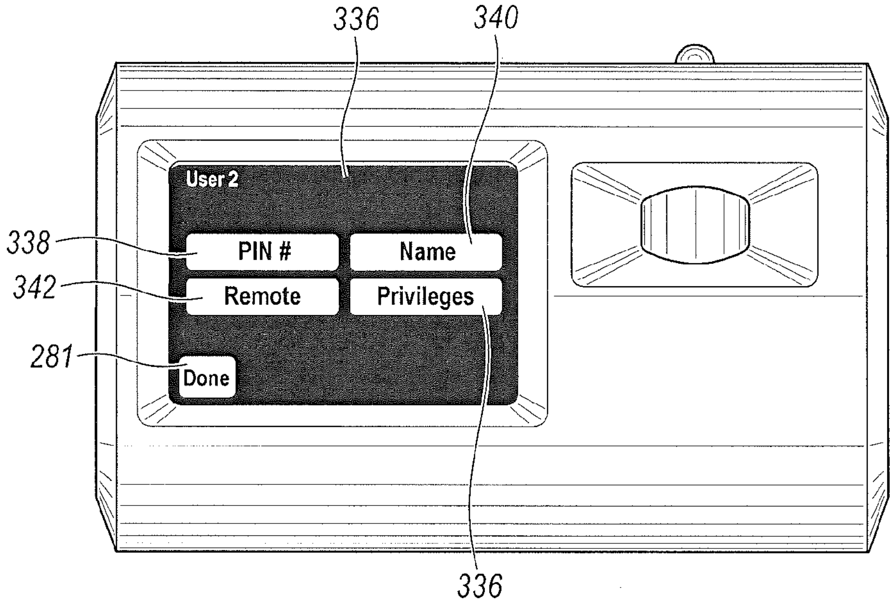
FIG. 24A illustrates an exemplary edit user screen on an exemplary consumer alarm unit.
Figure 24B:
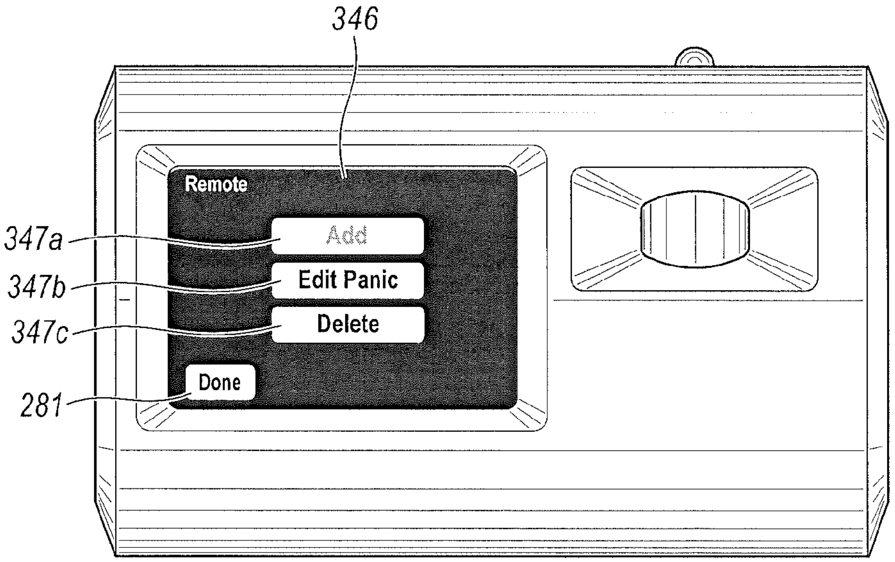
FIG. 24B illustrates an exemplary remote edit screen on an exemplary consumer alarm unit.
Figure 24C:
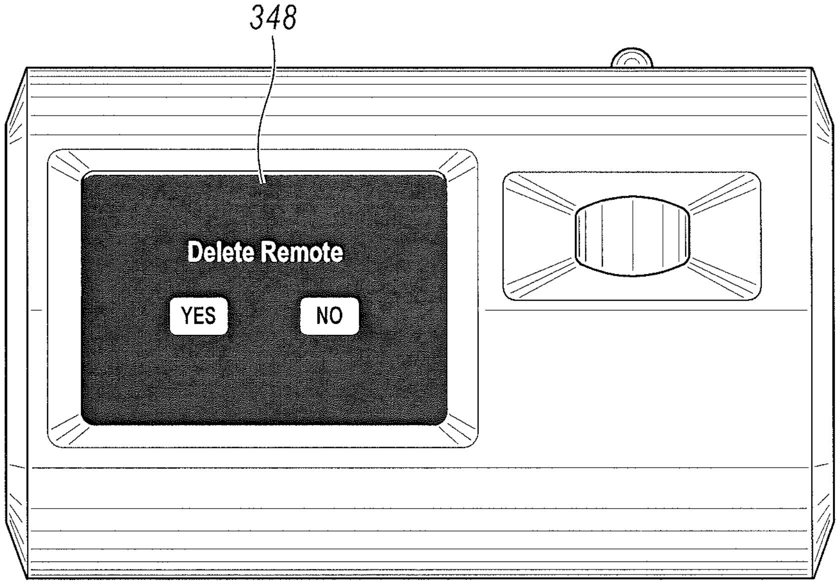
FIG. 24C illustrates an exemplary edit delete screen on an exemplary consumer alarm unit.

Once the new user 117 addition is complete the new user 117 appears on the user list 332 as user 2 (FIG. 23F). To delete or edit one of the users 116, 117, the users identifying name configured on the user list 332 is selected and one of the delete button 315B or edit button 315C may be depressed, which reveals a delete user screen 334 (FIG. 23G) or an edit user screen 336 (FIG. 24A). To delete user 116, 117 the yes or no buttons are selected and the user will now be removed from the alarm system 100. Additionally, if a remote device 104 was assigned to the deleted user, the remote device 104 will also be deleted from the alarm system 100. Alternatively, when editing, the user 116, 117 may select to edit the PIN #, the user name, the remote and the user privileges by depressing the corresponding PIN # button 338, name button 340, remote button 342 and the privileges button 336. When modifying the PIN #, the user 116, for example, must select an alpha or numeric sequence that is unique to the user 116 and different from other users, such as user 117. When editing the user name the user 116 must delete the current name and type a new alpha numeric name and then select done. The privileges may also be modified when selecting the privileges button 336, which reveals the previously discussed privileges screen 318 including the level buttons 320A, 320B and 320C.

Additionally, editing the remote handheld device 112 or key fob 128, 178 may be conducted by selecting the remote button 342, which reveals a remote edit screen 346 (FIG. 24B) having an add button 347A, an edit panic button 347B, a delete button 347C and the done button 281. The add button 347A is not active when a remote is assigned, but if one is not assigned, the selected user 116 or 117 may add one of the remote handheld device 112 or key fob 128, 178 by selecting the add button 347A. Selecting the delete button 347C reveals the edit delete screen 348 (FIG. 24C), which allows the user to choose yes or no to delete the device 112, 128, 178. Additionally, selecting the edit panic button 347B redirects the user 116, 117 back to the panic feature screen 326 (FIG. 23E) to edit the previously discussed panic features.

As discussed above, the settings screen 250 may include selection of the hot button 264. Hot buttons 264 may act as an auxiliary alarm that may be configured as a specific group of monitoring devices 120 configured to be armed and disarmed separate from the monitoring devices 120 associated with the home arming button 294 and the away arming button 296, as discussed above. The hot button 264 groups may be configured on a specific item, such as, but not limited to a personal jewelry box, liquor cabinet, safe, all-terrain vehicle and a wave runner or boat. The hot button 264 is designed for assets the user 116 would like to stay armed until the specific user 116 disarms the hot button 264, thus preventing other users 117 from removing the security on a specific item. The alarm system allows for a plurality of hot button 264 groups to be configured, each hot button 264 group having a specific audible and visible alarm or the alarm may be silent, depending on the application. Therefore, it should be evident that the base unit 140 with integrated processor and control panel 160 are configured to control at least two separate and distinct alarm segments a first segment that may include a perimeter of a house 216 and at least one additional segment configured adjacent to the first segment, each segment being controlled by the control panel 160, while being separately armed and disarmed.

Figure 25A:
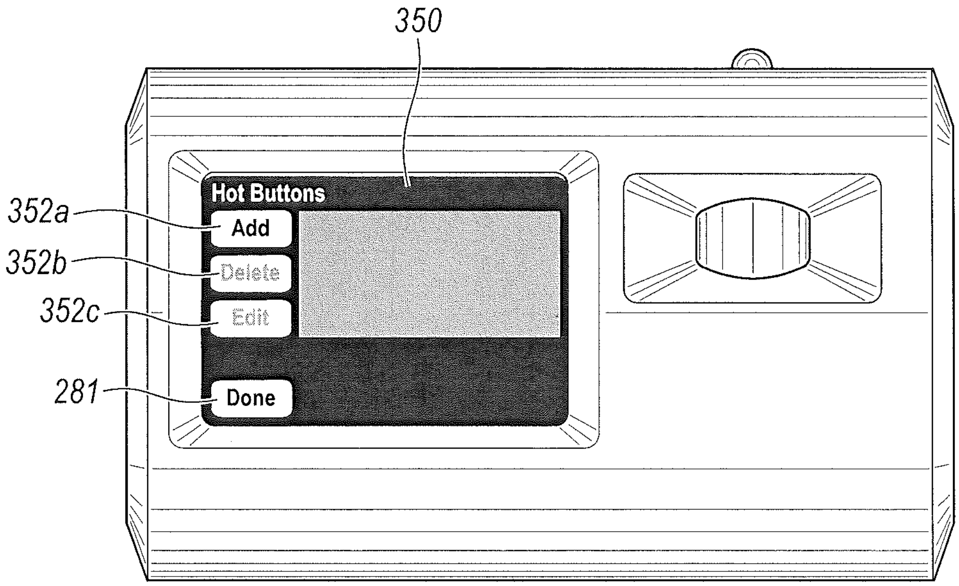
FIG. 25A illustrates an exemplary screen on an exemplary consumer alarm unit for addition of Hot Buttons.
Figure 25B:
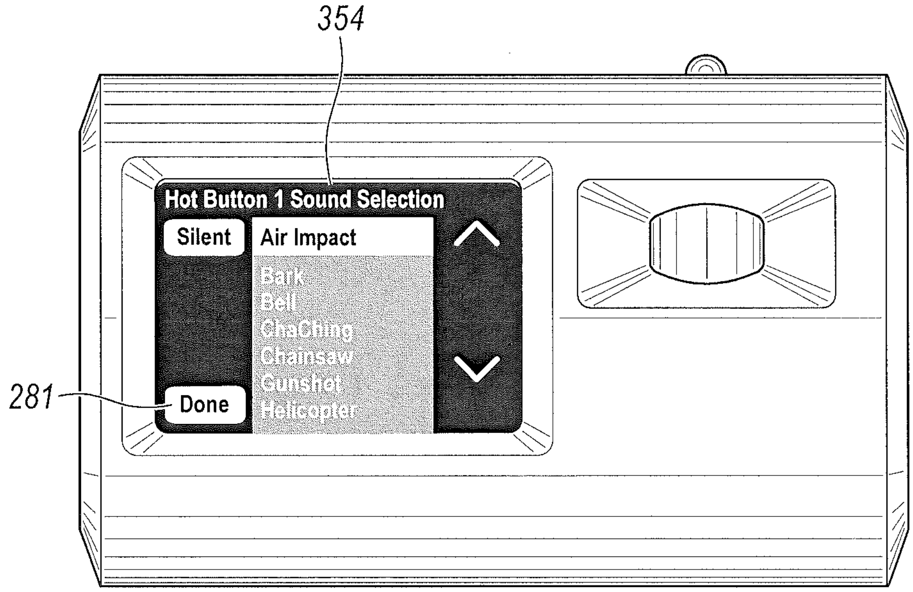
FIG. 25B illustrates an exemplary screen on an exemplary consumer alarm unit for Hot Button sound selection.
Figure 25C:
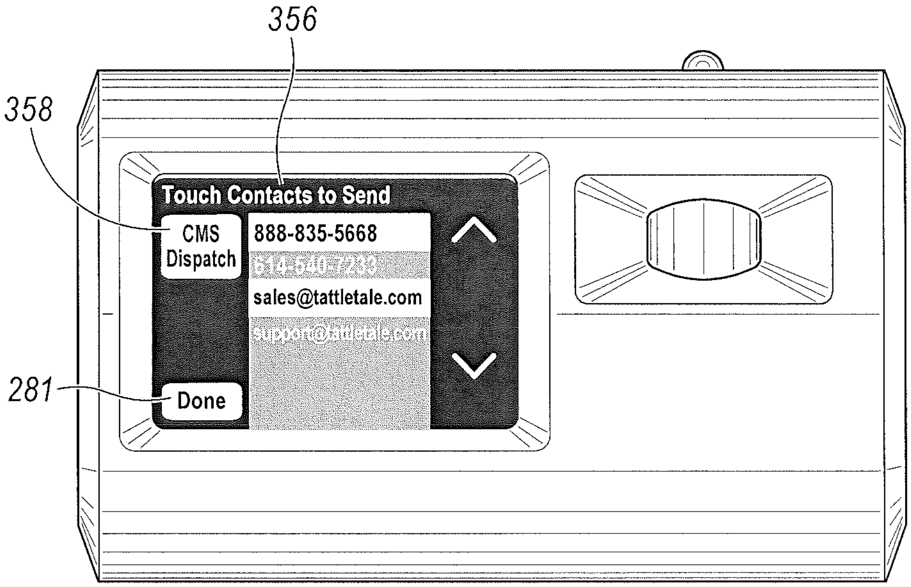
FIG. 25C illustrates an exemplary screen on an exemplary consumer alarm unit showing a list of contacts.

Selecting the hot button 264 reveals the hot button add screen 350 (FIG. 25A), which may include a hot button add button 352A, a hot button delete button 352B, a hot button edit button 352C and the done button 281. Adding a new hot button 264 includes selecting the add button 352A, which redirects the user to the sensor learn screen 282 that requires the user to follow the instructions for configuring the specific monitoring device 220, 224 to connect with the base unit 140. Once the monitoring device 220, 224 is recognized the user 116 may assign a name, using the keyboard 317 in FIG. 13, to the associated hot button monitoring device 220, 224, which may be labeled as hot button 1. Additionally, the user 116 may select a specific sound for the hot button 264 from the hot button sound selection screen 354 (FIG. 25B). The hot button 264 may be configured to communicate with the CMS 114 through the previously discussed protocols. To activate communication, the user 116 may select the CMS dispatch button 358 on the associated contacts screen 356 (FIG. 25C) along with the associated contact information where alarm messages will be sent. The user 116 may also add other contact information if desired, as will be discussed in the features section below.

Once a hot button 264 is added a chime may sound and the control panel 160 main screen becomes the hot button home screen 360 (FIG. 26A), which includes at least a hot button icon/button 362. Arming the hot button 264 requires the user to select the hot button icon/button 362, which reveals a hot button status screen 364 that may include a lock icon 365A and a chime icon 365B. The chime will be automatically enabled and will require the user 116 to select the chime icon 365B to disable the chime. Additionally, the lock icon 365A may be configured to identify if the associated monitoring device 220, 224 is ready for arming or if it is disconnected. The lock icon 365A may be a first color when the monitoring device 220, 224 is not ready and a second color when the monitoring device 120 is in a ready state. Once the monitoring device 220, 224 is in a ready state the user 116 may select the lock icon 365A to arm the hot button 264. Once armed the lock icon 365A will switch from an unlocked or open lock to a locked or closed lock with a red color. Additionally, the "H" in the center of the hot button 264 may change color or shape to illustrate that the hot button 264 is in an armed state. Disarming the hot button 365A requires the user to follow the same steps to reveal the hot button status screen 364 and the user may depress the lock icon 365A to disarm the hot button 362. As discussed above, a plurality of hot buttons 264 may be activated simultaneously and separately from the home arm and away armed modes.

Figure 26A:
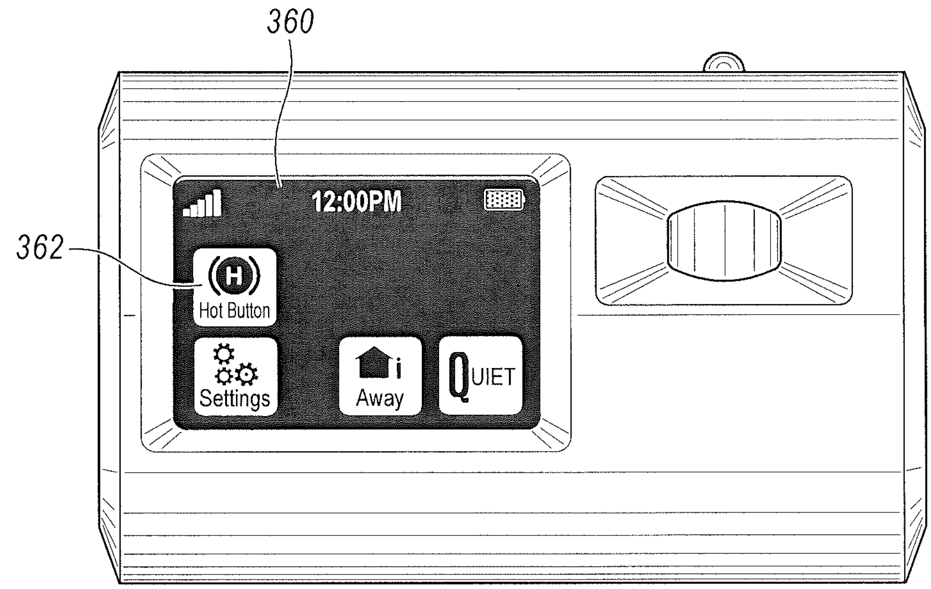
FIG. 26A illustrates an exemplary Hot Button home screen on an exemplary consumer alarm unit.
Figure 26B:
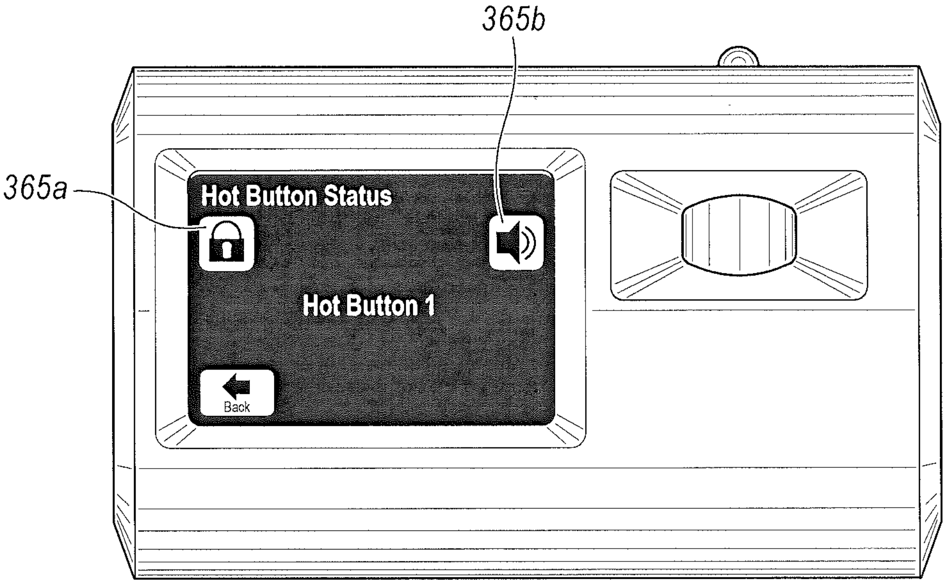
FIG. 26B illustrates an exemplary screen on an exemplary consumer alarm unit showing Hot Button status.
Figure 26C:
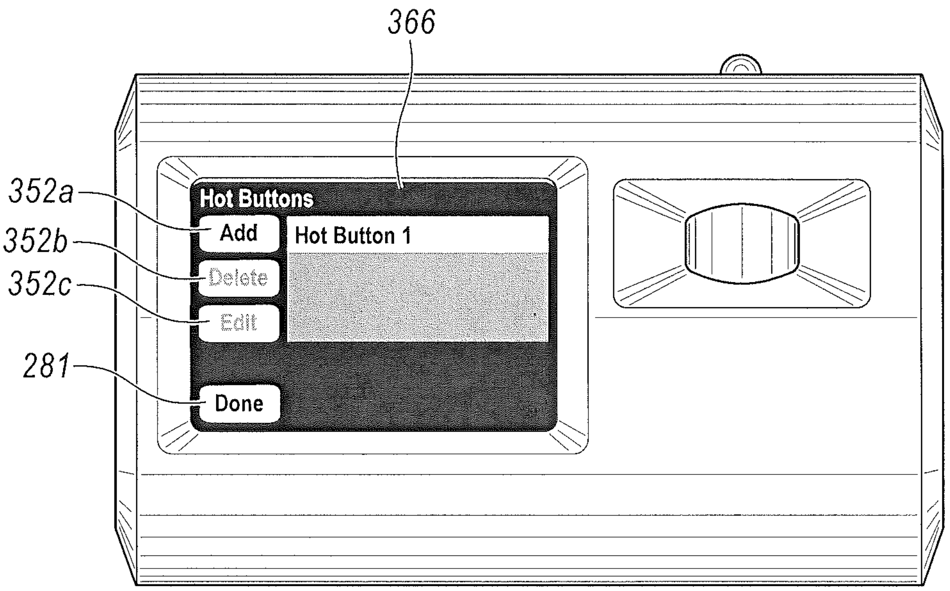
FIG. 26C illustrates an exemplary screen on an exemplary consumer alarm unit displaying list of Hot Buttons.
Figure 26D:
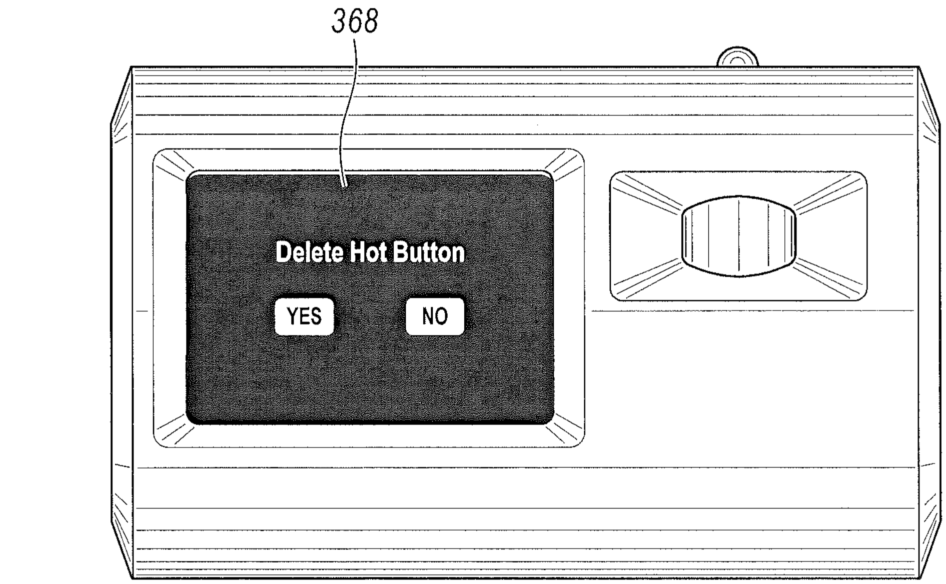
FIG. 26D illustrates an exemplary screen on an exemplary consumer alarm unit for deletion of Hot Buttons.
Figure 26E:
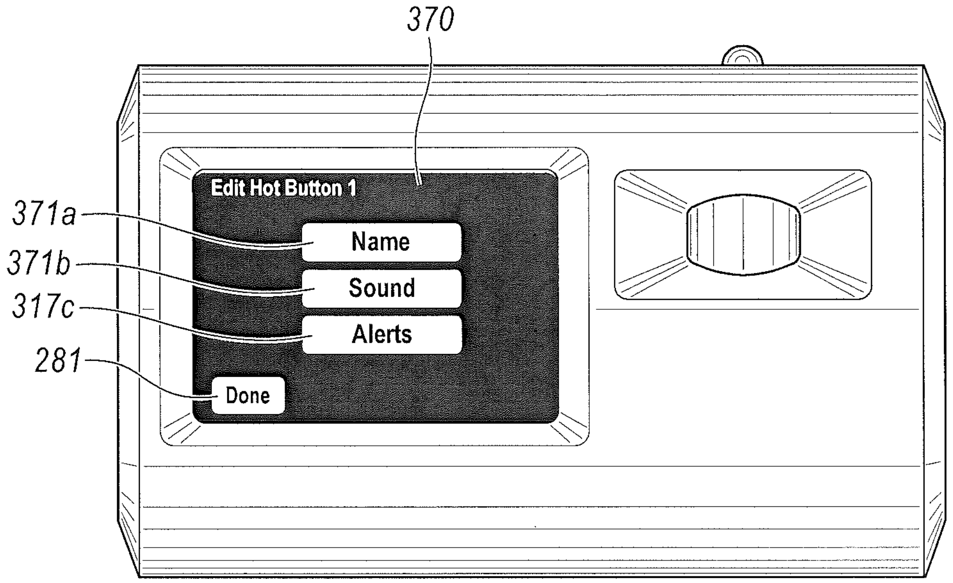
FIG. 26E illustrates an exemplary screen on an exemplary consumer alarm unit for edit of Hot Buttons.

Like the other monitoring devices 120, the associated hot button monitored devices 220, 224 may be deleted or edited using the hot button delete button 352B and the hot button edit button 352C, discussed above. To remove a hot button 264, select the hot button name from the hot button list 366 (FIG. 26C) and then select delete button 352B to reach and select one of the yes or no buttons on the hot button delete screen 368 (FIG. 26D). Editing the hot button 264 requires the same selection from the hot button list 366 and selection of the edit button 352C, which reveals the hot button edit screen 370 (FIG. 26E). The hot button edit screen 370 may include edit icons for the hot button name 371A, hot button sound 371B and the hot button alerts 371C. These icons/buttons correspond to the alpha numeric keyboard 317 for editing the hot button name; the sound selection screen 354 and the contacts screen 356, discussed above.

Figure 27A:
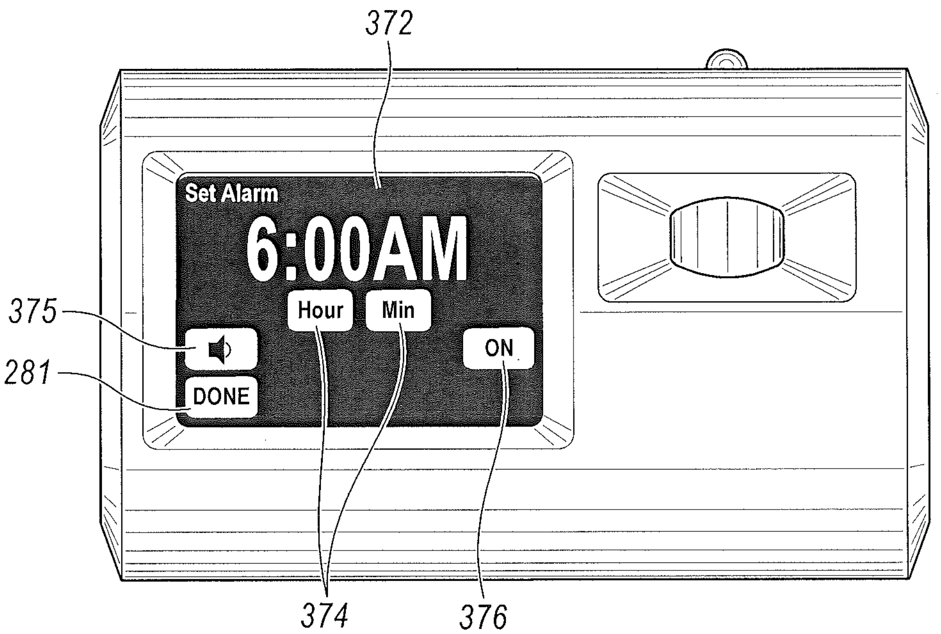
FIG. 27A illustrates an exemplary screen on an exemplary consumer alarm unit for alarm activation.
Figure 27B:
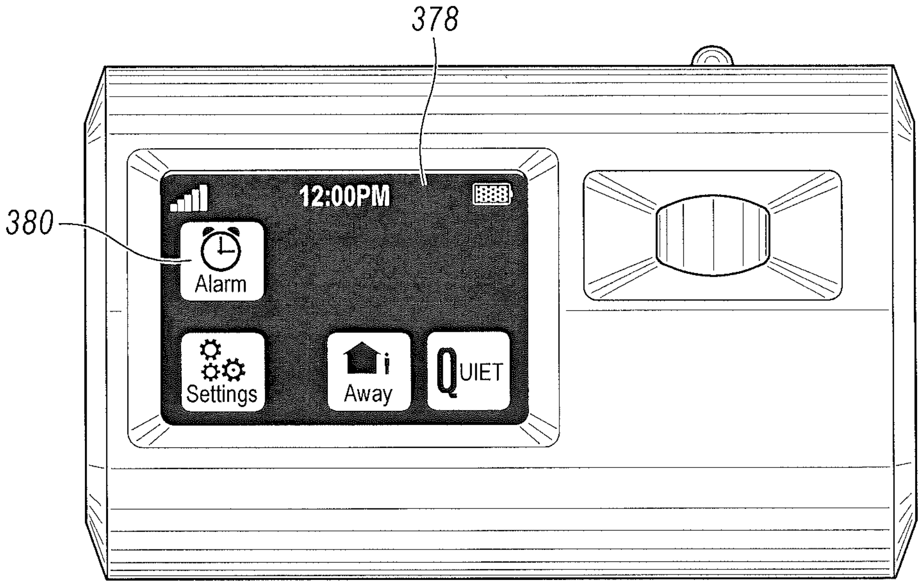
FIGS. 27B and 27C illustrate an exemplary alarm activated screen on an exemplary consumer alarm unit.
Figure 27C:
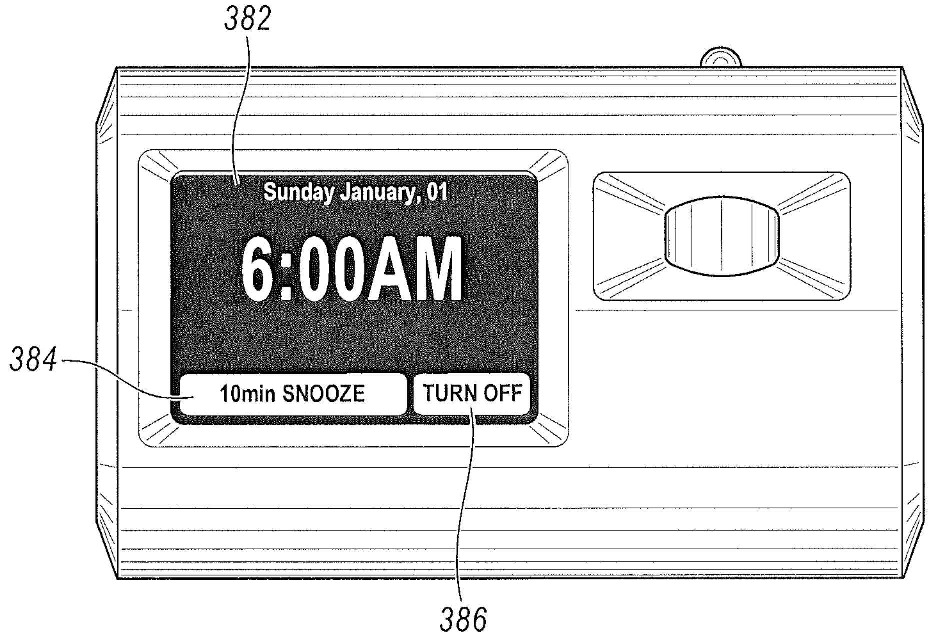
Figure 28:
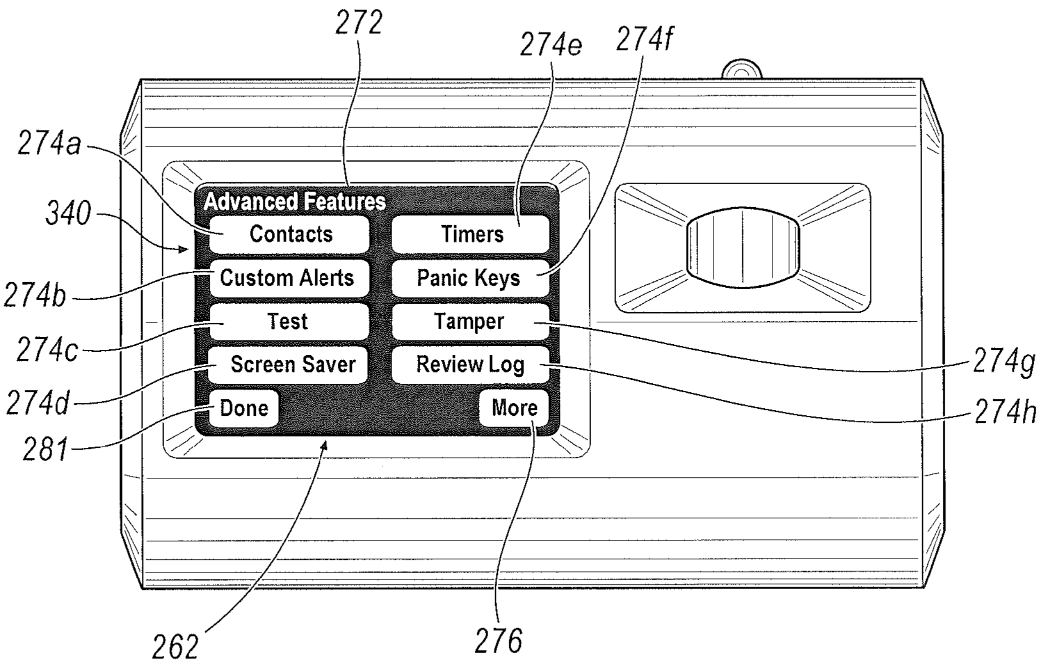
FIG. 28 illustrates an exemplary screen on an exemplary consumer alarm unit showing a menu with advanced features.
Figure 29:
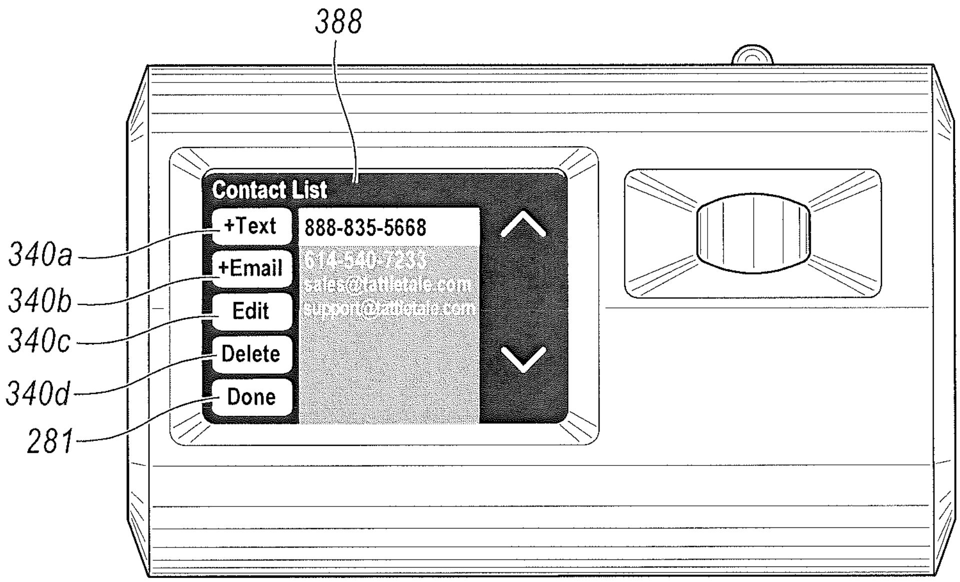
FIG. 29 illustrates an exemplary screen on an exemplary consumer alarm unit for entry of a phone number and email address to receive text message or email notifications.
Figure 30A:
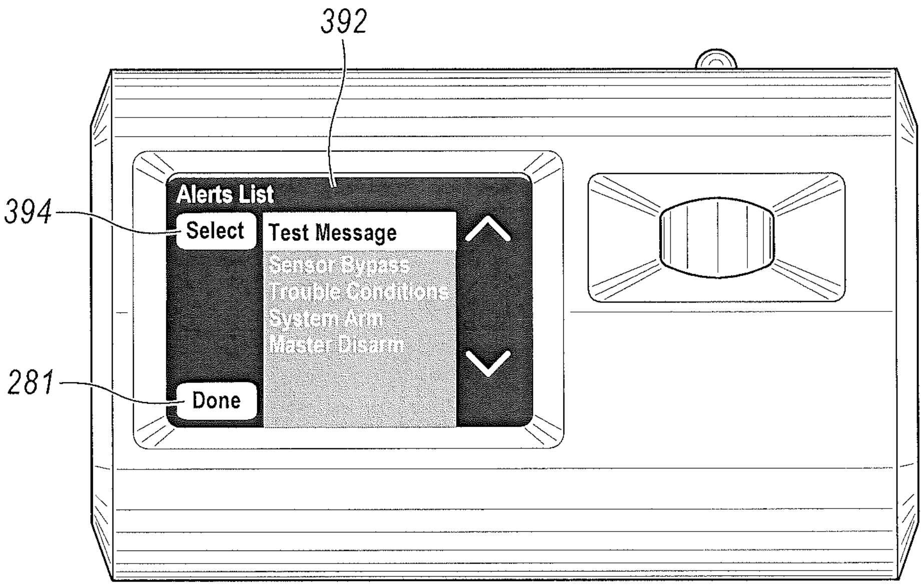
FIG. 30A illustrates an exemplary screen on an exemplary consumer alarm unit showing an alert list.
Figure 30B:
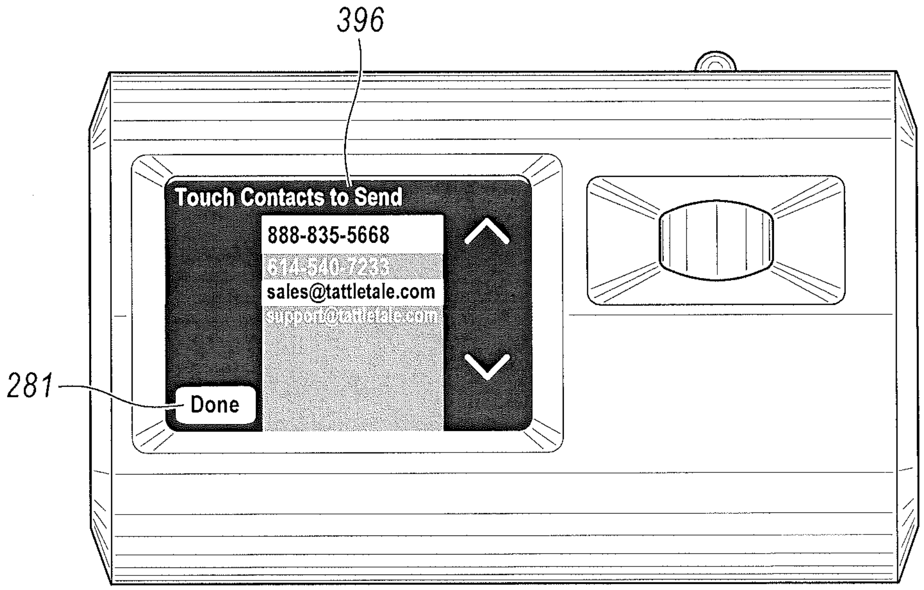
FIG. 30B illustrates an exemplary screen on an exemplary consumer alarm unit showing a contact list.
Figure 31:
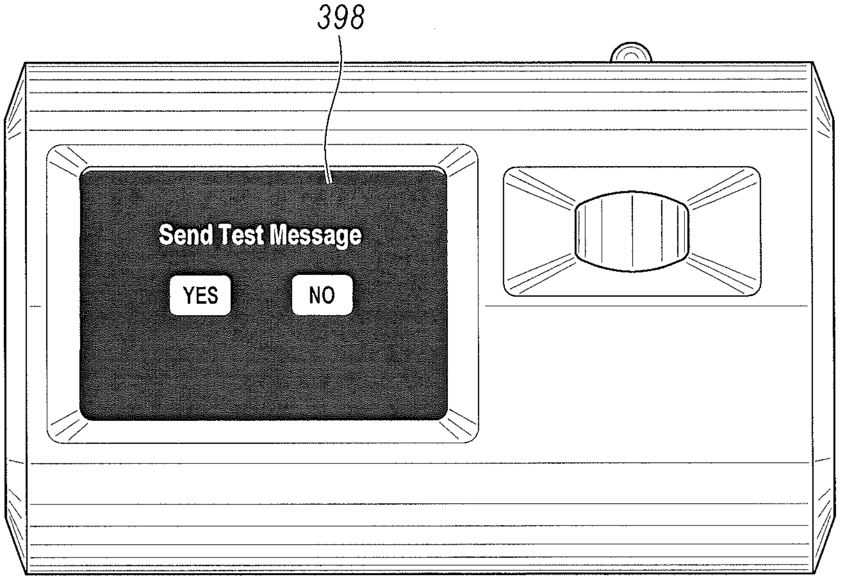
FIG. 31 illustrates an exemplary test message confirmation screen on an exemplary consumer alarm unit.
Figure 32:
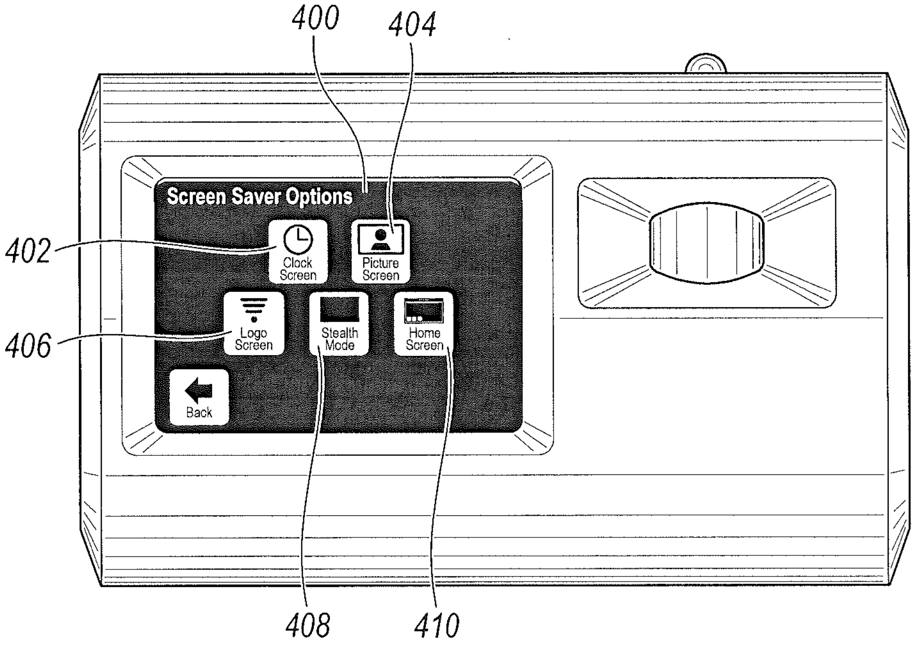
FIG. 32 illustrates an exemplary screen on an exemplary consumer alarm unit showing screen saver options.
Figure 33:
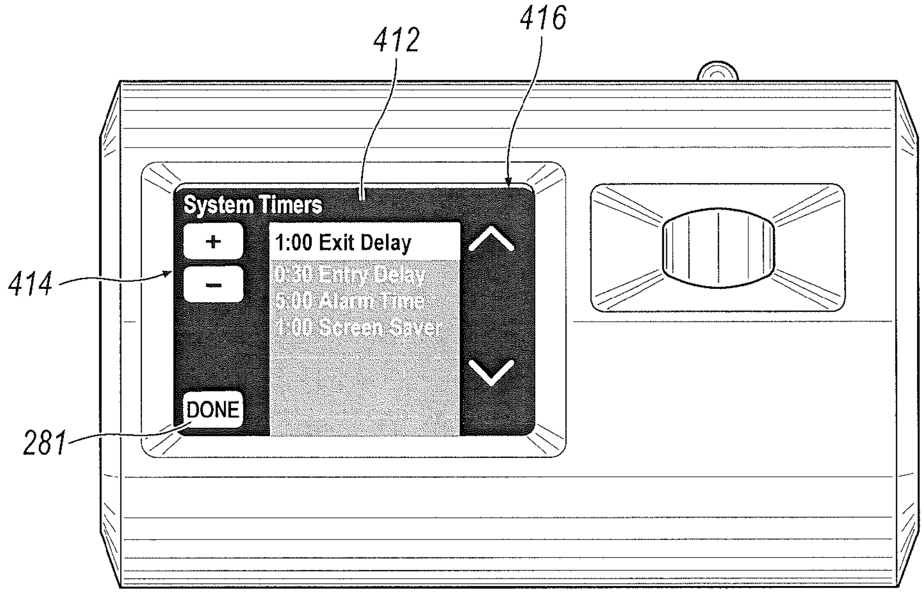
FIG. 33 illustrates an exemplary screen on an exemplary consumer alarm unit showing a timer list.

An alarm clock feature is illustrated on FIGS. 27A-27C, the alarm clock feature may be activated by selecting the alarm button 254 on the settings screen 250. The alarm clock screen 372 allows the user 116 to adjust the alarm time using the hour and minute buttons 374. Once the alarm time is selected, the user may select a chime button 375 for a specific alarm volume level. Additionally, the user 116 may activate the alarm by selecting the ON button 376. Once the alarm clock is activated, the alarm home screen 378 appears and an alarm icon/button 380 is revealed on the screen 378. The user 116 may toggle the alarm button 380 to turn the alarm on or off. Once the alarm clock is set and a wake-up time is achieved the alarm will sound to alert the user 116. The user 116 may select a snooze button 384 with a predetermined snooze time or the user 116 may elect to turn off the alarm clock by selecting the turn off button 386 configured on the alarm activated screen 382 (FIG. 27C).

Figure 14:
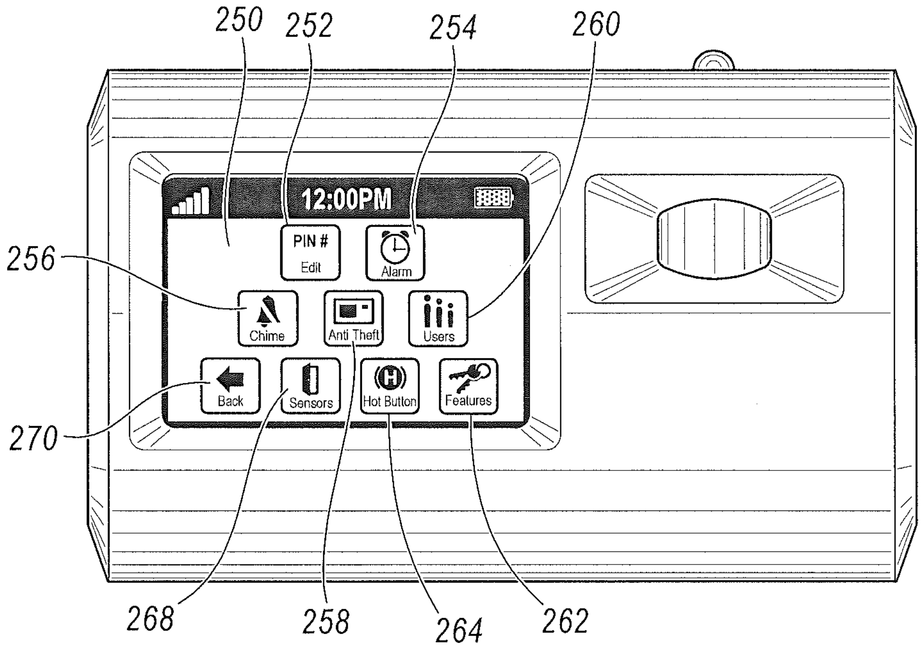
FIG. 14 illustrates an exemplary screen on an exemplary consumer alarm unit displaying a menu indicating features.

Turning specifically to FIGS. 14 and 28-39, the features button 262 has been selected on FIG. 14, which reveals the exemplary advanced features screen 272. The exemplary advanced features screen 272 may include a contacts button, 274A, a custom alerts button 274B, a test button 274C, a screen saver button 274D, a timers button 274E, a panic keys button 274F, a tamper button 274G, a review log button 274H, a more button 276 and the done button 281.

The contacts button 274A allows the user 116 to modify user contact information such as email address and phone number for receiving textual digital data or messages. The user may add a plurality of contact information in the contacts list 388 (FIG. 29) and all contacts on the list will receive an alarm message. The contact list screen 388 may include a text add button 340A, an email add button 340B, an edit button 340C, a delete button 340D and the done button 281. The various contact buttons 340A-340D allow the user 116 to add, edit and delete a specific contact, which will be listed on the contacts list screen 388.

The user 116 may customize the alarm system 100 by sending a specifically selected 394 message from an alert list 392 (FIG. 30A) to the user 116, such as, but not limited to a test message, a message when a sensor is bypassed, a message when a trouble condition is produced, a message with the alarm system 100 is armed or disarmed and when a hot button 264 group is armed or disarmed. Once the specific message is selected 394 from the alert list 392, the user 116 may select the specific contact 396 (FIG. 30B) to send the message. A test message confirmation screen 398 allows the user to confirm to send the message by selecting the yes button or prevent the message from being sent by selecting the no button.

The user 116 may also set the control panel 160 to a specific screen saver option screen 400 (FIG. 32) where the user 116 may select from the clock screen 402, a logo screen 406, a black stealth mode screen 408, a home screen 410 and a picture screen 404. The picture screen turns the control panel 160 into a rolling digital photo frame. The digital images/photos may be uploaded to the processor through the media slot 176, such that the images may be accessed and cycled through to show up on the control panel 160. The features screen 272 also provides the user 116 with the ability to adjust the entry and exit timers when arming and disarming the alarm system 100.

Selecting the timers button 274E allows the user 116 to select from a predetermined list of times 412 (FIG. 33) for exit delay, entry delay, alarm time and screen saver activation time. The times 412 may also be customized by selecting the + and − buttons 414 for each time element.

Figure 34:
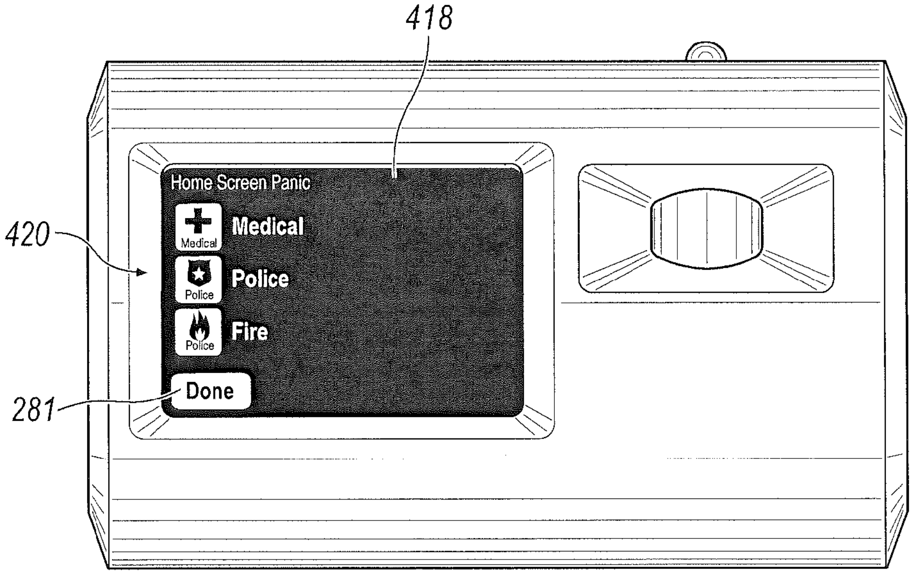
FIG. 34 illustrates an exemplary panic key home screen on an exemplary consumer alarm unit.
Figure 35:
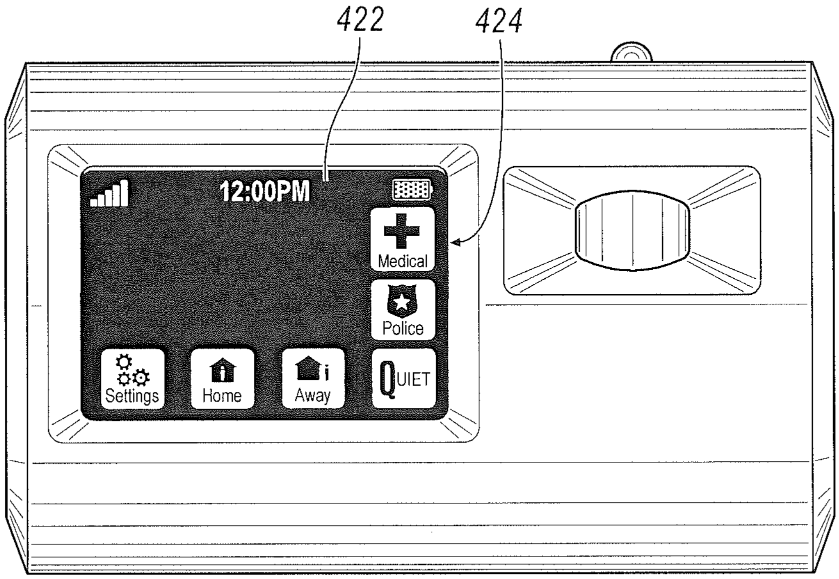
FIG. 35 illustrates an exemplary home screen on an exemplary consumer alarm unit.
Figure 36:
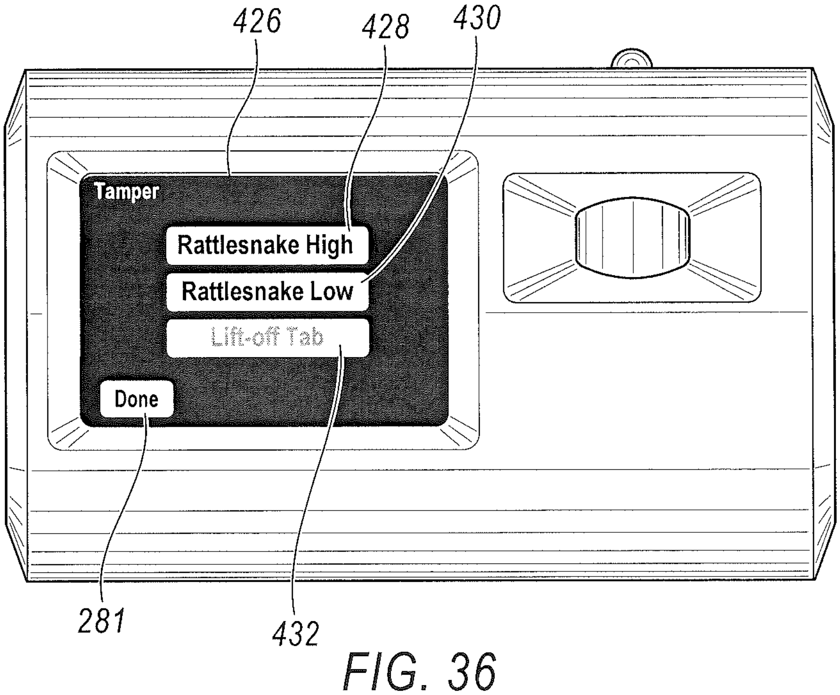
FIG. 36 illustrates an exemplary specific tamper screen on an exemplary consumer alarm unit.
Figure 37:
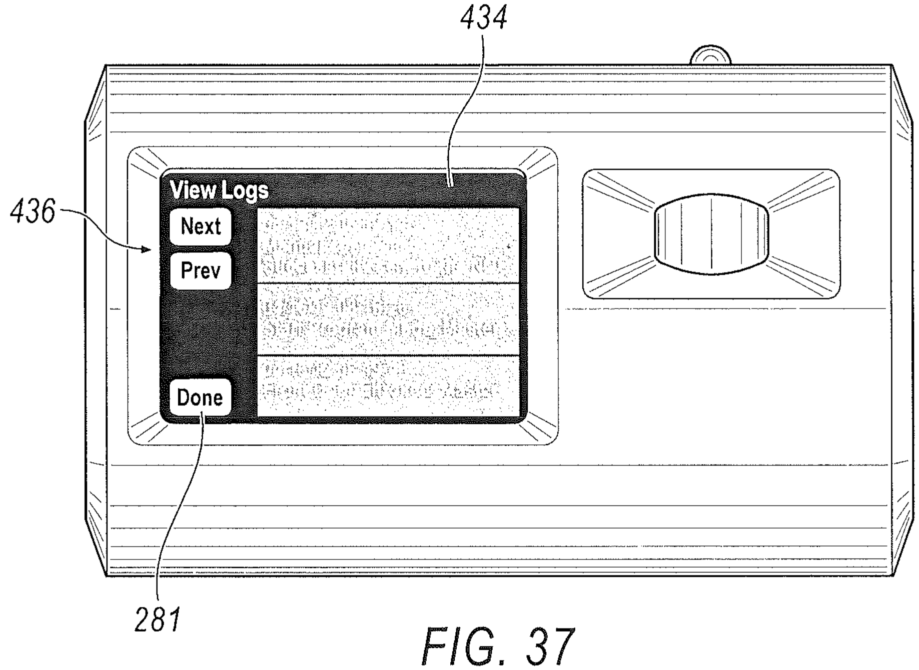
FIG. 37 illustrates an exemplary review log screen on an exemplary consumer alarm unit.
Figure 38:
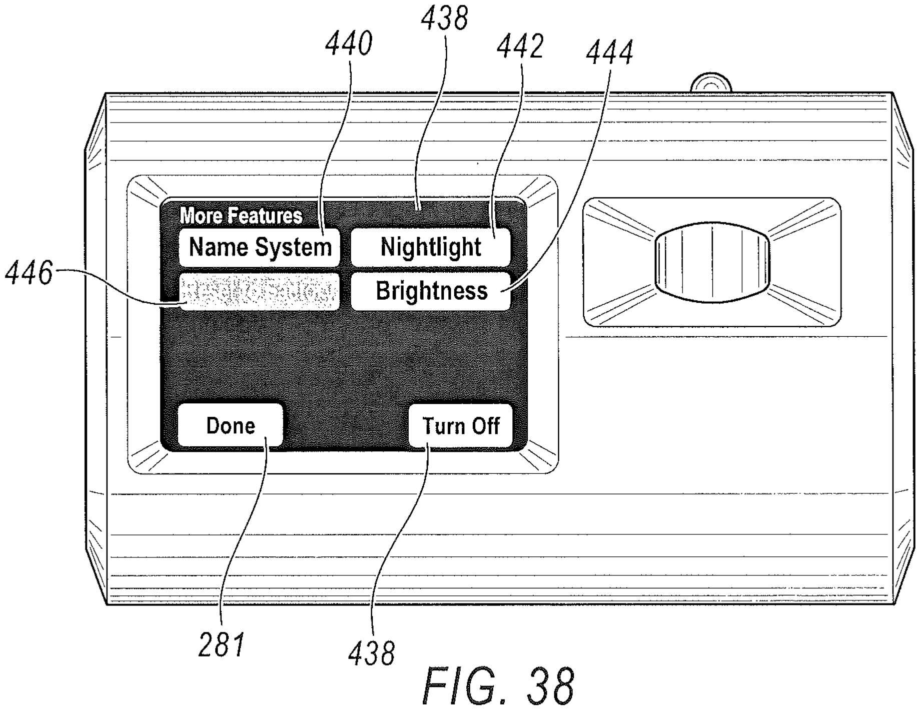
FIG. 38 illustrates an exemplary screen on an exemplary consumer alarm unit showing more features.
Figure 39:
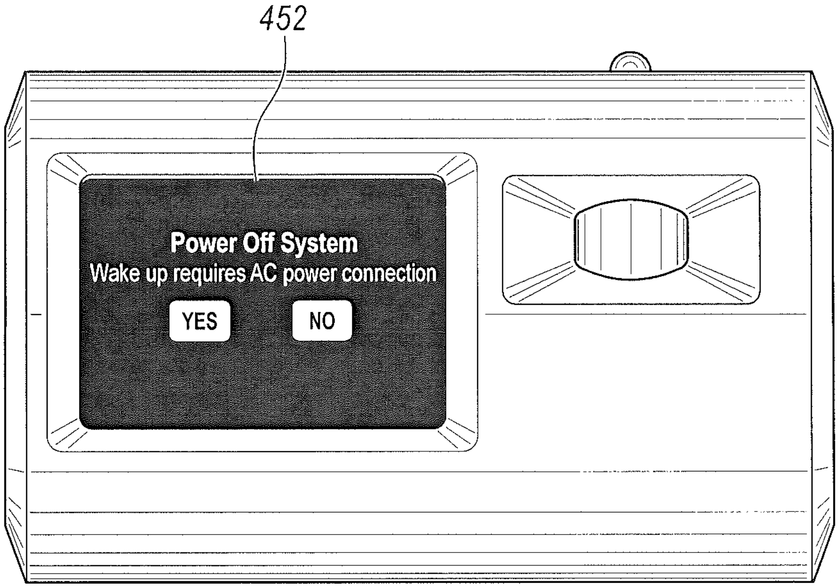
FIG. 39 illustrates an exemplary power off confirmation screen on an exemplary consumer alarm unit.

The user 116 may add specific panic keys 420 by selecting a panic key button 274F on the features screen 272, which reveals a panic key home screen 418 (FIG. 34). The panic keys 420 may include direct access to a specific emergency responder such as police, fire and ambulance and may correspond to the keys selected for the remote network devices 104, discussed above. By selecting a specific panic key 420 a corresponding key 424 is added to the home screen 422 (FIG. 35) for immediate connection to an emergency responder through the CMS 114.

The feature screen 272 may also include the ability to adjust the sensitivity of the anti-theft internal motion sensors between a high sensitivity and a low sensitivity to prevent the alarm from sounding when bumped by, for instance, an animal. The sensitivity may be adjusted by selecting the tamper button 274G on the feature screen 272, which reveals a specific tamper screen 426 (FIG. 36) having a rattlesnake high button 428, a rattlesnake low button 430, a lift-off tab button 432 and the done button 281. The rattlesnake tamper will activate an instant alarm connected to the anti-theft feature, discussed above, and will provide an instant alarm if the base unit is tampered with in any way during entry delay. The tamper feature may be set to low or high depending upon the amount of sensitivity desired. If the unit is removed from power during entry delay an instant alarm will occur, as discussed above. Alternatively, for mobile applications the base unit 140 may include a tamper tab (not illustrated) that is configured on the base unit 140. The tamper tab may be configured to extend into a slot (not illustrated) on the bottom of the base unit 140 extending toward the front of the base unit 140. Then, if the base unit 140 is removed or lifted off the tab during entry delay an instant alarm will occur. It should be known that when the tamper tab is used the base unit 140 must have the tab inserted to arm the alarm system 100.

Additionally, the tamper feature may be in communication with the GPS transceiver to activate the tracking and transmit a location signal to track the base unit 140 if it is removed from the user premises 102. The global positioning system (GPS) transceiver (not illustrated), provides location information for base unit 140. It is appreciated that other tracking devices or services, besides GPS, may be used. In one exemplary approach, the GPS transceiver may use a GPS broadcast signal received from one or more GPS satellite broadcast systems. Generally, the GPS transceiver monitors a location of the base unit 140 to provide location information to a remote device in response to a security event. For example, the processor may periodically receive location information from the GPS receiver in the form of longitude and latitude coordinates. The processor (not illustrated) may be configured to initiate an alert in response to a change in the received location information that indicates an unanticipated movement of the base unit 140. Furthermore, the processor may be configured to relay location information from the GPS transceiver to a remote device 104 through the wireless communication system. If the secured property is stolen, such location updates may aid emergency responders in locating and recovering the stolen property. Although as discussed above, the GPS transceiver is configured internal to the base unit 140 it is contemplated that the transceiver may be configured in any of the monitoring devices 120, sign 200 and may be disposed on the housing 142.

Constantly utilizing the GPS transceiver 140 may quickly deplete the power source not illustrated. Therefore, the system 100 may be configured so that the GPS transceiver is selectively enabled to conserve the power source. In one exemplary approach, the base unit 140 may be configured to detect a movement relative to the base unit 140. Once movement is detected, the base unit 140 may enable the GPS transceiver in response to the movement. Moreover, the base unit 140 may communicate with other devices to determine whether a perimeter has been breached, and if so, wake up the GPS transceiver in response. The sign 200, base unit 140, or CMS 114 may be configured to enable the GPS transceiver in response to other situations. This way, the GPS transceiver functions like an on-demand GPS system so that it's not constantly draining the power source. However, it is appreciated that the GPS transceiver may be enabled and/or woken up through other methods than described. In addition, GPS servicing or monitoring fees would also be reduced if the GPS function was only enabled according to a selective, on-demand basis. In other words, in this embodiment, a consumer would not be charged for GPS unless it was utilized.

It is appreciated that periodic communication between the alarm monitoring device 120, the base unit 140, and/or the CMS 114 may be through any protocol, such as a radio link broadcasting at a specific frequency, a Zigbee stack, WiFi, or any other known or proprietary communication protocol. Moreover, that frequency or a different frequency may be used to communicate security events and/or trigger alarms or tamper messages between the alarm monitoring device 120 and the base unit 140. For example, the periodic communication, the security event, and/or the tamper messages may be transmitted at a frequency of around 900 MHz or a frequency around 2.4 GHz. However, both of these frequencies are merely exemplary and other frequencies may be used. Furthermore, redundant communication may be used. In one exemplary approach, if the periodic communication using one protocol ceases, the alarm monitoring device 120, the base unit 140, and/or the central monitoring station 114 may begin to communicate through another protocol that has a different range, for example, as a backup.

The GPS transceiver may be used with other communication devices for tracking purposes, especially if the base unit 140 is not in an open area and able to communicate with a satellite. If the GPS transceiver is unable to communicate with the satellite, the base unit may be configured to communicate with one or more other tracking devices, such as cellular base stations (not illustrated). It is appreciated that other tracking devices may be used besides the GPS transceiver or cellular base station. Moreover, the location information may be provided by any protocol, including public or private radio networks, such as cellular towers, WiFi, or WiMax, among others.

The features screen 272 may include a review log on a review log screen 434, which allows the user 116 to review each event that has occurred. The review log is a timeline of activity and allows the user to quickly find a specific event by scrolling through the log using the next and previous buttons 436. The processor memory may be configured to store approximately 500 events in the log. Any alarm event or programming event will be on the view log list screen 434.

Additionally, the main features screen 272 may include a more button 276 that when selected takes the user to a secondary screen or more features screen 438. The more features screen 438 may include a name system button 440, a nightlight button 442, a brightness button 438, a turn off button and the done button 281. Selecting the name system button 440 reveals the previously discussed alpha numeric keypad 317 and allows the user 116 to type a specific name in for the base unit 140. The nightlight button 442 allows the visual indicator 168 to double as a nightlight. The nightlight will only work if the base unit 140 is connected to an AC power source. The night light may include varied levels of brightness that may be chosen by selecting the nightlight button 442.

The control panel 162 brightness may be adjusted by selecting the brightness button 444. Additionally, the base unit 140 may require that the processor be set to factory settings for proper use. The unit may also be shut down by removing the base unit 140 from the power source and selecting the turn off button 438 and then the power off selection must be confirmed by selecting yes or no on the power off confirmation page 452. The base unit 140 will need to shut down for a predetermined time period to prevent battery failure or accidental messages being sent.

FIGS. 40-44 illustrated exemplary flow diagrams to show the process of activating 500 the consumer alarm unit, arming 600 and disarming 700 the consumer alarm unit, adding or modifying at least one sensor 800 and adding or modifying users 900.

Figure 40:
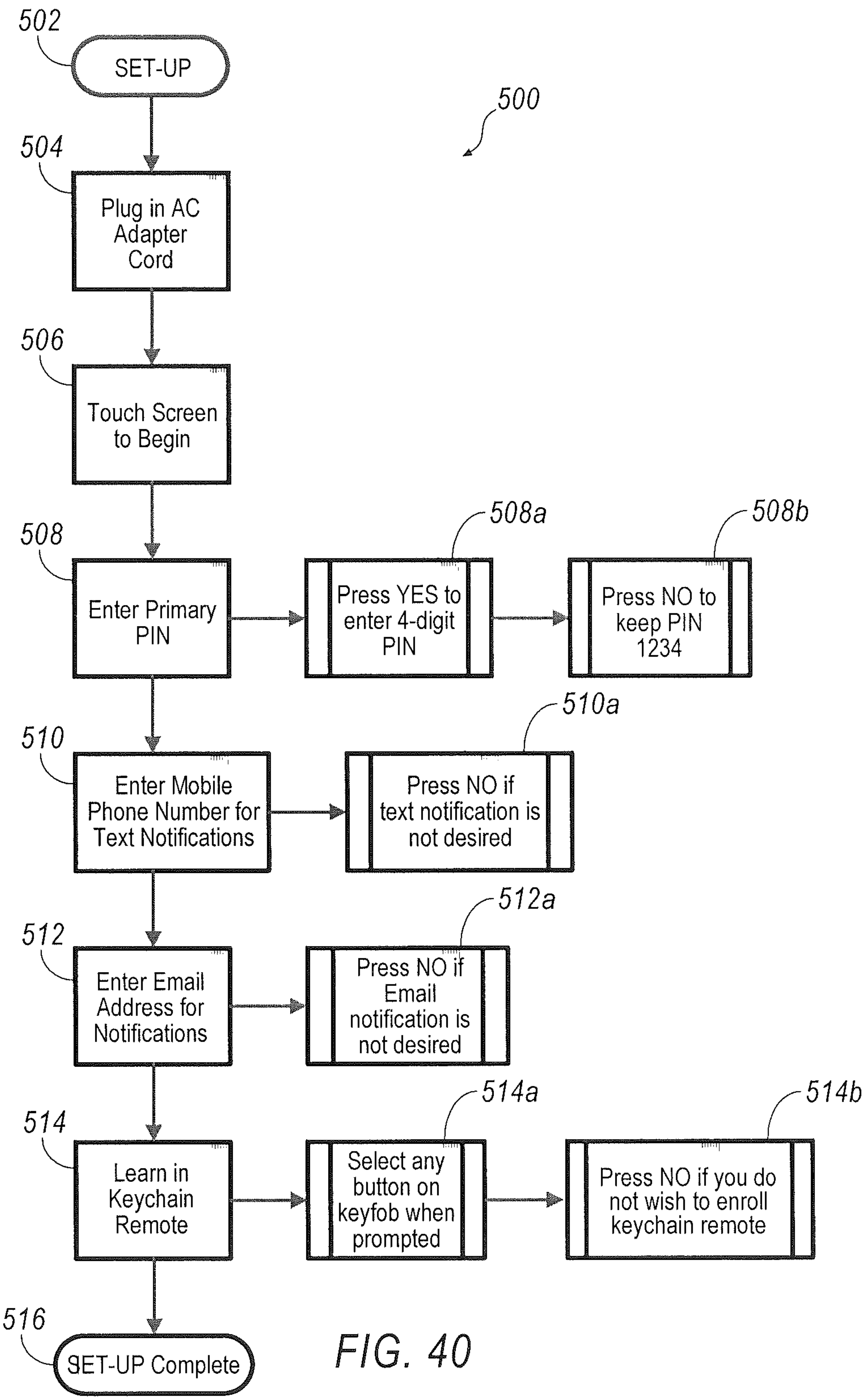
FIG. 40 illustrates an exemplary method for activating an exemplary consumer alarm unit.

FIG. 40 illustrates an initial set-up procedure 500. The procedure starts with an initial set-up step 502 of removing the unit and preparing it for AC power. Step 504 includes powering the base unit 140 up by plugging the AC adapter cord into the back of the base unit and plugging the opposing end into a power receptacle. Once power is supplied, turn to step 506 by touching the control panel 162 to activate the screen. At steps **508-508*b*, the base unit 140 will request the entrance or addition of a primary PIN #. The step 508*a* and 508*b* may require only the entering of the PIN # and the pressing of the yes or no may not be required. Contact information may be added at step 510 for entering individual user 116 phone numbers for receiving textual data. Step 512 allows the user to enter an email address for receiving additional communications form the base unit 140. Step 514 provides the user with the opportunity to add at least one portable handheld control device, as discussed above. The set-up procedure 500 may end at step 516 once all of the contact and other information is entered into the memory of the processor inside the base unit 140**.

Figure 41:
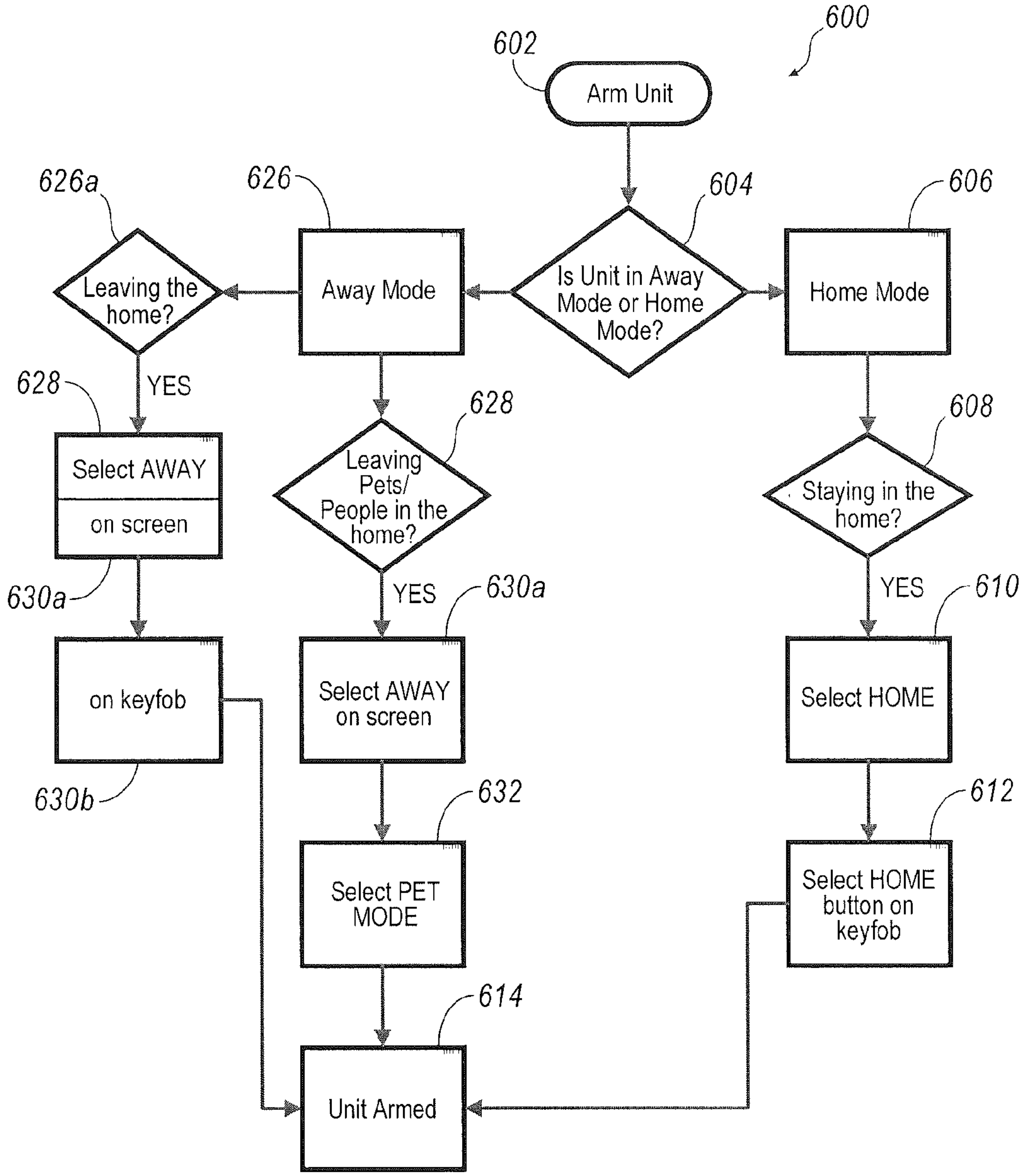
FIG. 41 illustrates an exemplary method for arming an exemplary consumer alarm unit.
Figure 42:
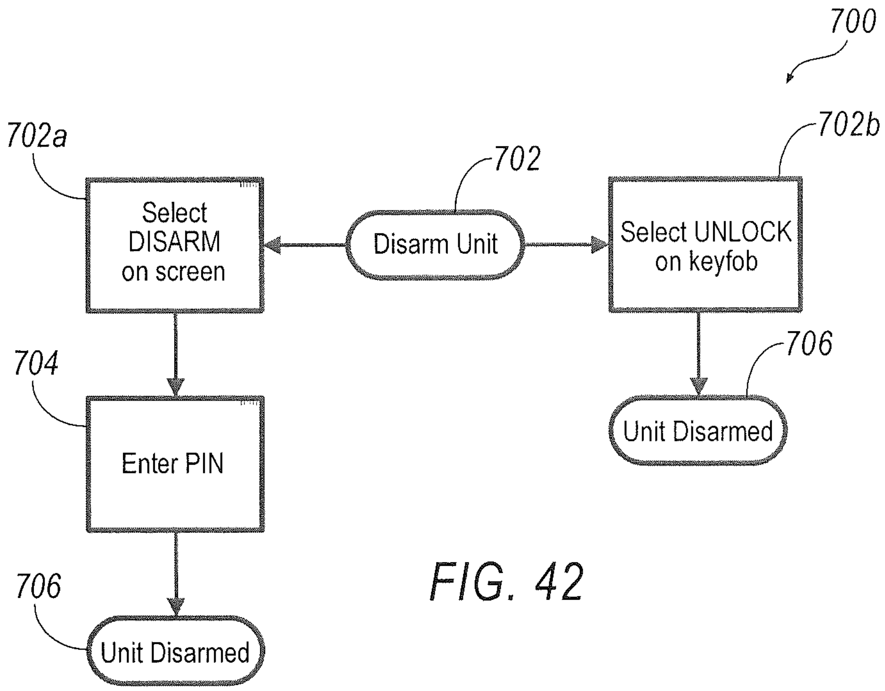
FIG. 42 illustrates an exemplary method for disarming an exemplary consumer alarm unit.

FIG. 41 illustrates the process for arming 600 the alarm system 100. Arming the alarm system starts at step 602 and proceeds to step 604 for determining whether alarm system 100 should be alarmed in home mode where the user 116 only wants the perimeter alarmed while the user is within house 216 or selecting the away mode where all sensors will be monitored and armed. Selecting the home mode is illustrated at step 606 wherein the user is staying home as illustrated in step 608. At step 610 selecting the home arm button on the at least one of the control panel home screen or on the key fob as in step 612. After selecting the arm buttons of either step 610 or step 612, the alarm system is armed as in step 614. When selecting the away mode in step 626, the user may select the away button in step 628 through the use of either the screen or the remote handheld device. However, an additional series of steps may also be included, specifically, in step 628 the user is leaving pets and/or people in the home at 630A the user is selecting the away button to activate the system and in step 632 activating the pet mode button for arming 614 the alarm system.

Disarming the alarm system 100 is illustrated at process 700 (FIG. 42) where disarming the unit 702 conducted. The system 100 may be disarmed by selecting the unlock button on the key fob 702 or by selecting the disarm button on the screen 702A and entering the user PIN into the keypad at step 704 to finally disarm the system 100 at step 706.

Figure 43:
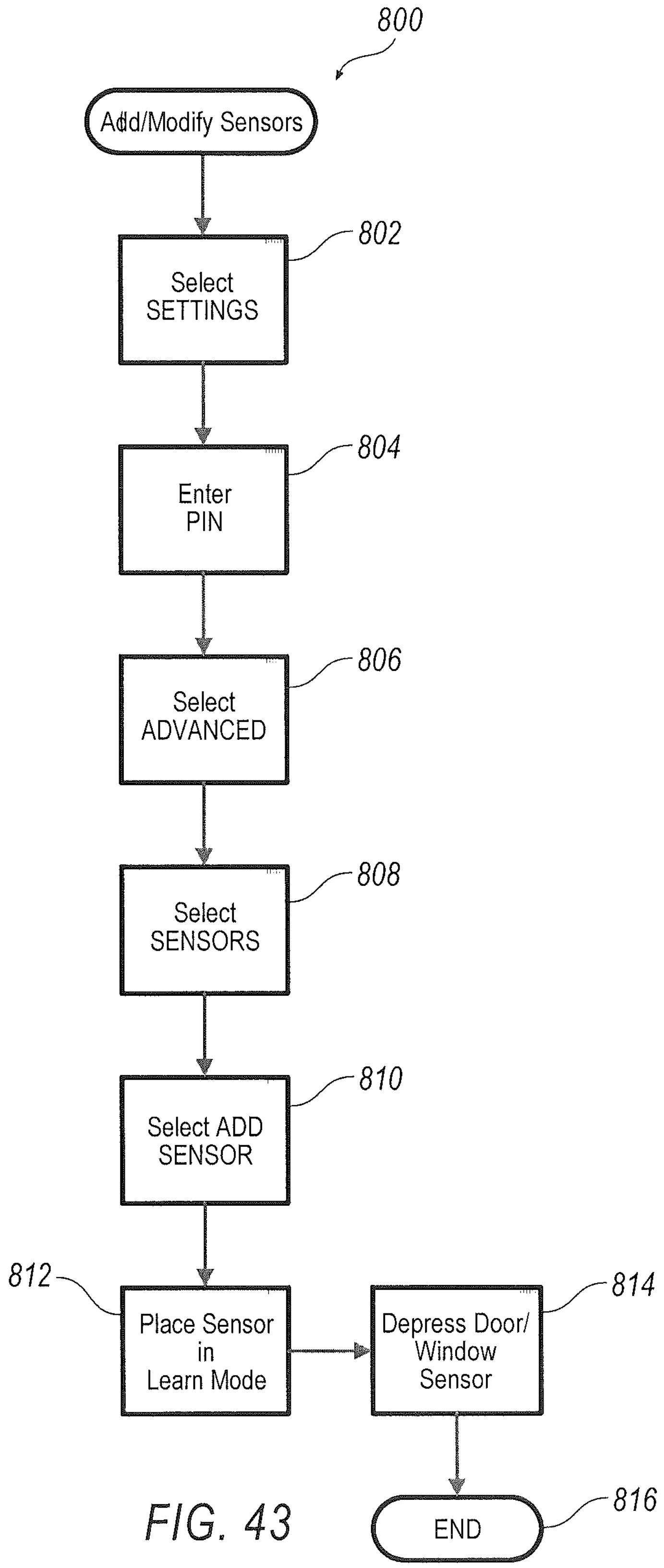
FIG. 43 illustrates an exemplary method for adding or modifying sensors on an exemplary consumer alarm unit.

The users may add or modify sensors as needed and illustrated in process 800 (FIG. 43). The sensors may be added by selecting the settings button at step 802, which triggers the alphanumeric PIN at step 804. Next the operator may proceed to step 806 for selecting advanced features or the operator may skip step 806 and proceed to selecting a specific sensor to add at step 808, as discussed in detail above. Selecting the add sensor button at step 810 forces the user to place the sensor in learn mode thereby creating a wireless communication pathway between the sensor and the base unit 140. Selecting the type or name of the sensor is conducted at step 814 and the process ends at step 816 when a chime is sounded acknowledging that the sensor has been added.

Figure 44:
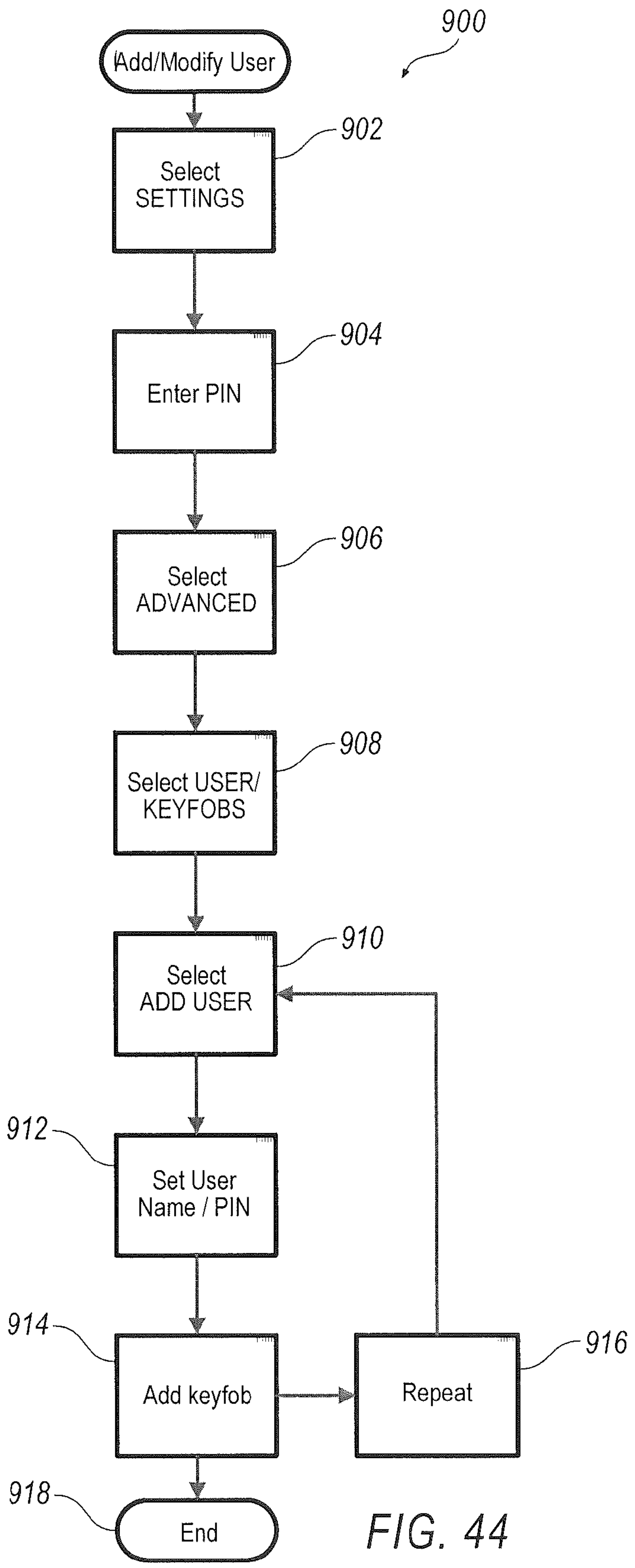
FIG. 44 illustrates an exemplary method for adding or modifying a user on an exemplary consumer alarm unit.

The process for adding and modifying users is demonstrated in FIG. 44 and process 900 where the users may be added by selecting the settings button at step 902, which triggers the alphanumeric PIN at step 904. Next the operator may proceed to step 906 for selecting advanced features or the operator may skip step 906 and proceed to selecting a specific user and associated key fob may be added at step 908, as discussed in detail above. Selecting the add user button at step 910 forces the user to enter the user name and/or PIN # at step 912. Adding the user specific key fob is started at 914 where the process may be repeated at step 916 for adding more users by repeating steps 910-914. The process ends at step 816 when a chime is sounded acknowledging that the user has been added.

It will be appreciated that the system and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this invention have been explained and illustrated in exemplary embodiments.

It is intended that the scope of the present methods and apparatuses be defined by the following claims. However, it must be understood that the exemplary embodiments may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the disclosure and that the method and apparatus within the scope of these claims and their equivalents be covered thereby. In sum, it should be understood that the exemplary embodiment is capable of modification and variation and is limited only by the following claims.

What is claimed is:

1. A portable alarm system, comprising:

a portable enclosure that houses a portable power source, a motion sensor configured to detect movement of said portable enclosure, a controller and a wireless transceiver, said controller being in communication with at least said portable motion sensor and said wireless transceiver; and, at least one sensor that is positioned external to and separate from said enclosure and configured to monitor activity external to and separate from said enclosure, said wireless transceiver being configured to receive wireless signals from said at least one sensor;

wherein said controller is configured to cause the alarm system to have at least an armed state, a disarmed state, and an entry delay state, said armed state being characterized by said controller transitioning from said armed state to said entry delay state in response to communication from said sensor positioned external to and separate from said enclosure, and said entry delay state being characterized by said controller generating an alarm signal absent action by a user to transition said controller from said entry delay state to said disarmed state within a predetermined period of time;

wherein said controller is further configured to cause the alarm system to initiate an alarm signal in response to detection of movement of the said portable enclosure while the alarm system is in the entry delay state.

2. The portable alarm system of claim 1, wherein said alarm signal causes an audible sound to be generated.

3. The portable alarm system of claim 1, wherein said alarm signal causes a communication to be transmitted by said wireless transceiver to a remote monitoring location.

4. A portable alarm system, comprising:

a portable enclosure that houses a portable power source, a motion sensor configured to detect movement of said portable enclosure, a controller and a wireless transceiver, said controller being in communication with at least said portable motion sensor and said wireless transceiver;

said portable enclosure further including an input port for receiving electrical power from an external power source and a sensor for determining whether the alarm system is receiving power from an external power source;

at least one sensor that is positioned external to and separate from said enclosure and configured to monitor activity external to and separate from said enclosure, said wireless transceiver being configured to receive wireless signals from said at least one sensor;

wherein said controller is configured to cause the alarm system to have at least an armed state, a disarmed state, and an entry delay state, said armed state being characterized by said controller transitioning from said armed state to said entry delay state in response to communication from said sensor positioned external to and separate from said enclosure, and said entry delay state being characterized by said controller generating an alarm signal absent action by a user to transition said controller from said entry delay state to said disarmed state within a predetermined period of time;

wherein said controller is configured to cause the alarm system to initiate an alarm signal in response to detection of a disconnection of the external power source from the alarm system.

5. The portable alarm system of claim 4, wherein said alarm signal causes an audible sound to be generated.

6. The portable alarm system of claim 4, wherein said alarm signal causes a communication to be transmitted by said wireless transceiver to a remote monitoring location.

* * * * *